(12) United States Patent
Lev

(10) Patent No.: US 12,118,427 B2
(45) Date of Patent: Oct. 15, 2024

(54) INVISIBLE COATED INFRARED PATTERNS

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 487 days.

(21) Appl. No.: 17/158,065

(22) Filed: Jan. 26, 2021

(65) Prior Publication Data

US 2022/0237396 A1  Jul. 28, 2022

(51) Int. Cl.
*G06K 7/14* (2006.01)
*G06K 19/06* (2006.01)
*G08C 23/04* (2006.01)

(52) U.S. Cl.
CPC ..... *G06K 7/1404* (2013.01); *G06K 19/06056* (2013.01); *G08C 23/04* (2013.01)

(58) Field of Classification Search
CPC ........... G06K 7/1404; G06K 19/06056; G06K 19/0614; G06K 19/06; G06K 7/12; G08C 23/04; B42D 15/085
See application file for complete search history.

(56) References Cited

U.S. PATENT DOCUMENTS

| | | | | |
|---|---|---|---|---|
| 3,962,009 A | * | 6/1976 | Minami | B32B 25/04 427/595 |
| 4,136,224 A | * | 1/1979 | Minami | B44C 3/025 428/152 |
| 4,359,633 A | * | 11/1982 | Bianco | G06K 19/14 235/468 |
| 4,538,059 A | * | 8/1985 | Rudland | G06K 19/14 235/487 |
| 4,869,532 A | * | 9/1989 | Abe | C09D 11/50 283/88 |
| 4,945,215 A | * | 7/1990 | Fukushima | B42D 25/425 235/457 |
| 5,151,595 A | * | 9/1992 | Filo | B41M 5/26 250/271 |
| 5,380,044 A | * | 1/1995 | Aitkens | B42D 25/318 283/109 |

(Continued)

FOREIGN PATENT DOCUMENTS

JP        06106875 A  *  4/1994

OTHER PUBLICATIONS

Chen "Passive Infrared Markers for Indoors Robotic Positioning and Navigation", IS&T International Symposium on Electronic Imaging 2020 Intelligent Robotics and Industrial Applications Using Computer Vision, 013-1-013-6, Published Onlkine Jan. 26, 2020.

*Primary Examiner* — Daniel I Walsh

(57) ABSTRACT

An article having an invisible infrared pattern is disclosed. The article includes at least one infrared pattern printed onto a surface. The infrared pattern includes regions of high absorption and high reflection for a plurality of wavelengths of infrared radiation ranging between 700 and 2000 nm. A coating is overlaid over the infrared pattern. The coating is made of a material and has a thickness that is penetrable by infrared radiation and that has an average opacity of at least 20 for light in the visible range.

13 Claims, 21 Drawing Sheets
(17 of 21 Drawing Sheet(s) Filed in Color)

(56) References Cited

U.S. PATENT DOCUMENTS

| | | | | |
|---|---|---|---|---|
| 5,545,883 | A * | 8/1996 | Sasou | G06K 19/06187 235/440 |
| 5,686,725 | A * | 11/1997 | Maruyama | G06K 19/18 250/341.8 |
| 5,801,067 | A * | 9/1998 | Shaw | G03B 27/521 |
| 5,814,806 | A * | 9/1998 | Tanaka | G06K 19/06028 235/494 |
| 5,856,048 | A * | 1/1999 | Tahara | G06K 19/06046 283/88 |
| 5,868,075 | A * | 2/1999 | Kline | H04N 1/1911 358/448 |
| 6,165,937 | A * | 12/2000 | Puckett | B41M 5/42 503/201 |
| 6,203,069 | B1 * | 3/2001 | Outwater | G09F 3/0294 283/88 |
| 6,987,868 | B1 * | 1/2006 | Atarashi | G07D 7/02 382/135 |
| 7,079,230 | B1 * | 7/2006 | McInerney | G06K 19/14 356/71 |
| 7,544,266 | B2 * | 6/2009 | Herring | B32B 38/1841 40/124.191 |
| 7,961,364 | B2 * | 6/2011 | Lapstun | G06V 30/142 358/488 |
| 8,006,909 | B2 * | 8/2011 | Swiler | B05D 5/06 235/494 |
| 10,049,477 | B1 | 8/2018 | Kokemohr | G06T 11/001 |
| 11,461,607 | B2 * | 10/2022 | Duarte | G06K 19/0614 |
| 11,487,961 | B2 * | 11/2022 | Teraura | G06K 19/0614 |
| 2003/0010229 | A1 * | 1/2003 | Fujita | B65H 18/00 101/38.1 |
| 2004/0170304 | A1 * | 9/2004 | Haven | G06V 40/19 382/115 |
| 2005/0035590 | A1 * | 2/2005 | Jones | B42D 25/435 283/74 |
| 2005/0092844 | A1 * | 5/2005 | Zhang | G06K 7/0004 235/487 |
| 2005/0257880 | A1 * | 11/2005 | Herring | B42D 25/387 156/243 |
| 2006/0113386 | A1 * | 6/2006 | Olmstead | G06K 7/10732 235/455 |
| 2006/0131425 | A1 * | 6/2006 | Stenzel | G07D 7/12 235/491 |
| 2006/0148641 | A1 * | 7/2006 | Muller | B26F 3/004 264/157 |
| 2007/0138286 | A1 * | 6/2007 | Kamijoh | G06K 19/06037 235/468 |
| 2008/0250960 | A1 * | 10/2008 | Taylor | B41F 27/005 29/464 |
| 2008/0261687 | A1 * | 10/2008 | Gatzios | A63F 1/02 235/491 |
| 2008/0304696 | A1 * | 12/2008 | Eschbach | H04N 1/32352 358/1.1 |
| 2009/0246517 | A1 * | 10/2009 | Hatta | B32B 17/10788 156/99 |
| 2009/0285448 | A1 * | 11/2009 | Carpenter | G07D 7/206 382/101 |
| 2011/0042471 | A1 * | 2/2011 | Futaeda | F24D 13/02 165/56 |
| 2011/0121951 | A1 * | 5/2011 | Yao | H01M 50/107 340/10.42 |
| 2011/0267601 | A1 * | 11/2011 | Woodford | G07D 7/004 235/375 |
| 2013/0001310 | A1 * | 1/2013 | Miyazaki | G06K 7/10732 235/494 |
| 2013/0127980 | A1 * | 5/2013 | Haddick | G06F 3/013 348/14.08 |
| 2014/0092002 | A1 * | 4/2014 | Manzari | G06F 3/0346 345/156 |
| 2014/0151996 | A1 * | 6/2014 | Camus | D21H 21/40 283/67 |
| 2014/0198348 | A1 * | 7/2014 | Yoshida | H04N 1/3232 358/3.28 |
| 2015/0191132 | A1 * | 7/2015 | Muramoto | B32B 15/08 40/208 |
| 2015/0240297 | A1 * | 8/2015 | Jaime | C12Q 1/6827 536/23.1 |
| 2017/0262090 | A1 * | 9/2017 | Thomas | G06F 3/03542 |
| 2018/0218248 | A1 * | 8/2018 | Haas | G06F 3/011 |
| 2018/0298219 | A1 * | 10/2018 | Loccufier | B41J 11/002 |
| 2019/0075290 | A1 * | 3/2019 | Dubey | H04N 17/002 |
| 2019/0176487 | A1 * | 6/2019 | Hirai | C09D 11/322 |
| 2019/0196382 | A1 * | 6/2019 | Tanaka | G03G 21/04 |
| 2019/0278098 | A1 * | 9/2019 | Prest | H04M 1/0283 |
| 2019/0315149 | A1 * | 10/2019 | Biernacki | G06F 21/30 |
| 2019/0364251 | A1 * | 11/2019 | Tsubota | G03B 21/2073 |
| 2020/0015323 | A1 * | 1/2020 | Chen | H05B 3/145 |
| 2020/0042849 | A1 * | 2/2020 | Howard | G06K 19/06037 |
| 2020/0086668 | A1 * | 3/2020 | Fujita | B41M 5/0011 |
| 2020/0098951 | A1 * | 3/2020 | Hartlove | H05B 33/20 |
| 2020/0249673 | A1 * | 8/2020 | Fleishman | G06K 19/06065 |
| 2020/0399834 | A1 * | 12/2020 | Reed | D21H 19/38 |
| 2021/0027033 | A1 * | 1/2021 | Howard | G06V 20/582 |
| 2021/0229834 | A1 * | 7/2021 | Howard | G05D 1/101 |
| 2022/0168991 | A1 * | 6/2022 | Furuta | B32B 27/16 |
| 2022/0237396 | A1 * | 7/2022 | Lev | G06K 1/123 |
| 2022/0259461 | A1 * | 8/2022 | Feinstein | C09J 7/21 |
| 2023/0385586 | A1 * | 11/2023 | Duarte | B42D 25/373 |

* cited by examiner

414

430

550

530

540a

540b

614

630

640

1350

1330

1340

INVISIBLE COATED INFRARED PATTERNS

FIELD AND BACKGROUND OF THE INVENTION

The present invention, in some embodiments, relates to an article having an invisible infrared pattern, and more specifically, but not exclusively, to an article including a coating overlaid over an infrared pattern, wherein the coating is made of a material and has a thickness that is penetrable by infrared radiation and is substantially opaque to light in the visible range.

Visual machine codes or fiducial markers are two-dimensional binary patterns that are detectable using computer vision algorithms. Examples of such visual machine codes include Quick Response (QR) codes, AprilTag™ markers, and ArUCo™ markers. Visual machine codes are useful for product designation, product information, inventory management, and for detecting or proving location or pose. However, these codes may be visually unattractive and interfere with the visual design of an interior or exterior space.

One solution for generating visual machine codes that are not visually obtrusive is to use an infrared paint or ink. These paints or inks (hereinafter, "infrared paints") appear of a certain color in the visible spectral range (approximately 400-700 nm), but have different absorption in the near infrared range (approximately 700-1000 nm) or shortwave infrared range (approximately 1000-2000 nm). However, while it is possible to generate nearly any visual CIE value with infrared paints, it is challenging to find an infrared paint that is practically usable in the long term. Many infrared paints are unstable over time, because they do not last under sunlight (a common problem of paints based on organic materials). Other infrared paints are not infrared-absorptive or receptive enough to be visible under normal lighting, especially LED or fluorescent lighting which has very little infrared spectral components. These paints require special infrared illumination to be readable. Even among infrared paints that are stable and readable under normal conditions, it is hard to tailor the visual CIE value and texture to match exactly that of a known existing surface. Instead, what results is a slightly mismatched patch, akin to application of a fresh square of paint over a previously painted wall.

SUMMARY OF THE INVENTION

It is an object of the present disclosure to provide an article including an infrared code that is both inconspicuous and stable. It is a further object of the present disclosure to provide an article that can be blended into a surface having any color or texture. According to a first aspect, an article having at least one invisible infrared pattern is disclosed. The article includes at least one infrared pattern printed onto a surface. The infrared pattern includes regions of high absorption and high reflection for a plurality of wavelengths of infrared radiation ranging between 700 and 2000 nm. A coating is overlaid over the at least one infrared pattern. The coating is made of a material and has a thickness that is penetrable by infrared radiation and that has an average opacity of at least 20 for light in the visible range. Advantageously, because the coating is penetrable by infrared radiation, an infrared imager is able to detect the infrared pattern under the coating. However, the opacity of the coating to visible radiation is sufficient that the infrared pattern is not detectable under standard lighting conditions.

In another implementation according to the first aspect, the at least one infrared pattern is printed onto a surface, and at least one of (1) the coating is of a same color as the surface; and (2) the coating is of a same texture as the surface. Advantageously, because the coating is of the same color and/or texture as the surface, the coating blends together with the surface, rendering the entire article essentially indistinguishable from the surface.

In another implementation according to claim 1, the coating is comprised of one or more of a paper, a plastic, and a layer of printed ink. In another implementation according to claim 1, the coating is comprised of a polyvinyl chloride wallpaper. These different materials all may exhibit the necessary combination of penetrability to infrared radiation and opacity in the visible range.

In another implementation according to the first aspect, the coating is comprised of a material that protects the at least one infrared pattern from damage caused by abrasion, organic solvents, moisture, and sunlight. For example, the coating may be any of the materials described above. Advantageously, using such materials helps ensure that the infrared pattern is maintained over a long period of time.

In another implementation according to the first aspect, the thickness of the coating is between 50 and 300 microns. Advantageously, such a thickness is thin enough to be penetrable by infrared radiation, while thick enough to have the necessary opacity in visible radiation.

In another implementation according to the first aspect, the at least one infrared pattern is printed onto or adhered to a face of the material of the coating, and the face is adhered to a surface such that the coating is overlaid over the at least one infrared pattern. For example, the pattern may be printed or adhered to the adhesive face of wallpaper, and the adhesive face may be adhered to the surface, such that the article is formed with the wallpaper covering the pattern. Advantageously, in these embodiments, it is possible to print the infrared pattern using a conventional horizontal inkjet printer, as opposed to printing a pattern directly on the surface, which may require a vertical printer.

Optionally, the coating is a roll of wallpaper, and the at least one infrared pattern comprises a plurality of infrared patterns printed onto or adhered onto the face of the wallpaper. The infrared patterns may be different from each other. Advantageously, in a single application, a user may adhere a wallpaper having multiple patterns onto the same surface.

According to a second aspect, a method is disclosed. The method includes printing at least one infrared pattern including regions of high absorption and high reflection for a plurality of wavelengths of infrared radiation ranging between 700 and 2000 nm, and overlaying a coating over the at least one infrared pattern. The coating is made of a material and has a thickness that is penetrable by infrared radiation and has an average opacity of at least 20 for light in the visible range. Advantageously, because the coating is penetrable by infrared radiation, an infrared imager is able to detect the infrared pattern under the coating. However, the opacity of the coating to visible radiation is sufficient that the infrared pattern is not detectable under standard lighting conditions.

In another implementation according to the second aspect, the printing step comprises printing the at least one infrared pattern onto a surface. At least one of (1) the coating is of a same color as the surface; and (2) the coating is of a same texture as the surface. Advantageously, because the coating is of the same color and/or texture as the surface, the coating blends together with the surface, rendering the entire article essentially indistinguishable from the surface.

In another implementation according to the second aspect, the coating is comprised of one or more of a paper, a plastic, and layer of printed ink. In another implementation according to the second aspect, the coating is comprised of a polyvinyl chloride wallpaper. These different materials all may exhibit the necessary combination of penetrability to infrared radiation and at least partial opacity in the visible range. In another implementation according to the second aspect, the coating is comprised of a material that protects the at least one infrared pattern from damage caused by abrasion, organic solvents, moisture, and sunlight. For example, the coating may be any of the materials described above. Advantageously, using such materials helps ensure that the infrared pattern is maintained over a long period of time.

In another implementation according to the second aspect, the thickness is between 50 and 300 microns. Advantageously, such a thickness is thin enough to be penetrable by infrared radiation, while thick enough to have the necessary opacity in visible radiation.

In another implementation according to the second aspect, the printing step comprises printing the infrared pattern on, or adhering the infrared pattern to, a face of the material of the coating, and the overlaying step comprises adhering the face to a surface such that the coating is overlaid over the infrared pattern. For example, the pattern may be printed or adhered to the adhesive face of wallpaper, and the adhesive face may be adhered to the surface, such that the article is formed. Advantageously, in these embodiments it is possible to print the infrared pattern using a conventional horizontal inkjet printer, as opposed to printing a pattern directly on the surface, which may require a vertical printer.

Optionally, the coating comprises a roll of wallpaper, and the printing step comprises printing a plurality of infrared patterns, or adhering the plurality of patterns, onto the face of the wallpaper. Advantageously, in a single application, a user may adhere a wallpaper having multiple patterns onto the same surface.

In another implementation according to the second aspect, the method further comprises imaging an article including the infrared pattern and an overlaid coating with an imager capable of imaging infrared radiation, and enhancing the imaged infrared pattern with contrast enhancement and edge sharpening. The imager may be any device suitable for imaging infrared radiation, such as a device that is designed exclusively for infrared imaging, or a standard camera with an infrared filter. Typically, the imaged infrared pattern is not of equivalent resolution to an infrared pattern that may be imaged from an exposed pattern. The enhancing thus improves the resolution of the imaged pattern, so that the code that is formed from the pattern may be read.

Optionally, the infrared pattern is a machine readable code, and the method further comprises reading the code. For example, the code may be a QR code, an AprilTag™ code, or an ArUCo™ code. Reading the code may include extracting information that is encoded with the code.

Optionally, the surface is an interior wall of a ceiling of an environment, and the imaging step is performed when the environment is lit with only white fluorescent light. Advantageously, in such embodiments, the infrared pattern is readable even without introduction of infrared lighting.

Optionally, the method comprises, during the imaging step, sequentially projecting one or more of time-modulated near infrared radiation, short wave infrared radiation, or visible illumination onto the article. The method further includes, during the enhancing step, comparing at least one image of the article obtained with projected infrared radiation with a corresponding at least one image of the article obtained with ambient or projected visible illumination. Advantageously, the comparing may be used to subtract the image obtained from visible illumination with the image obtained with infrared illumination, in order to thereby sharpen the imaged infrared pattern.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-1C illustrate a method of forming an article including an infrared pattern covered with a coating, in which the infrared pattern is printed onto a surface, according to embodiments of the present disclosure;

FIGS. 2A-2C illustrate a second embodiment of a method of forming an article including an infrared pattern covered with a coating, in which the pattern is printed on or adhered to a rear side of the coating, according to embodiments of the present disclosure;

FIGS. 2D-2F illustrate a variation of the method of FIGS. 2A-2C, in which multiple infrared patterns are printed or adhered to a rear side of the same coating, according to embodiments of the present disclosure;

Figure 1A:
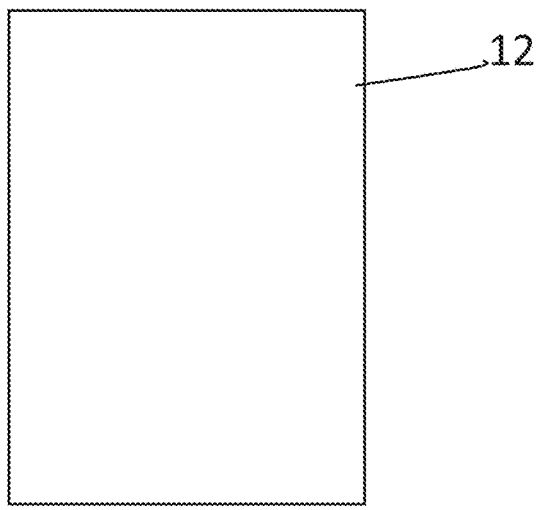
Figure 1B:
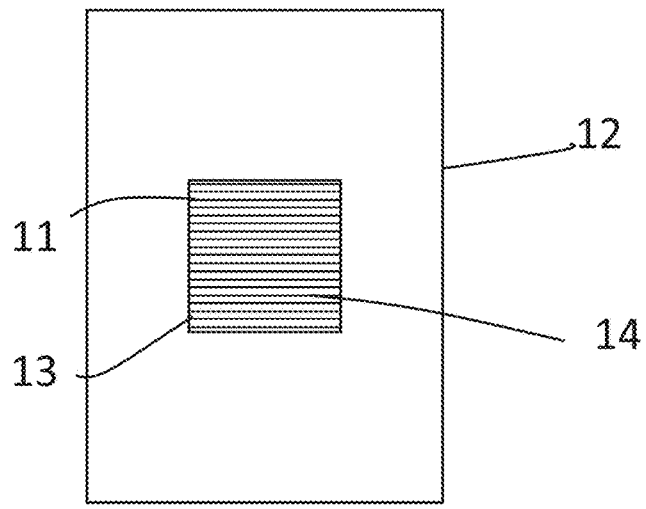
Figure 1C:
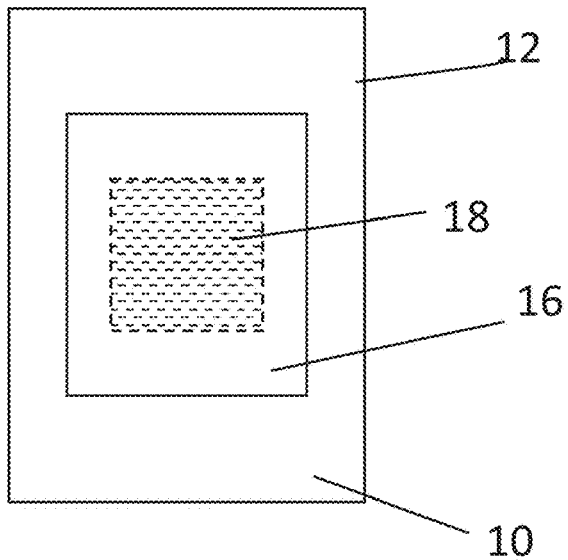
Figure 2A:
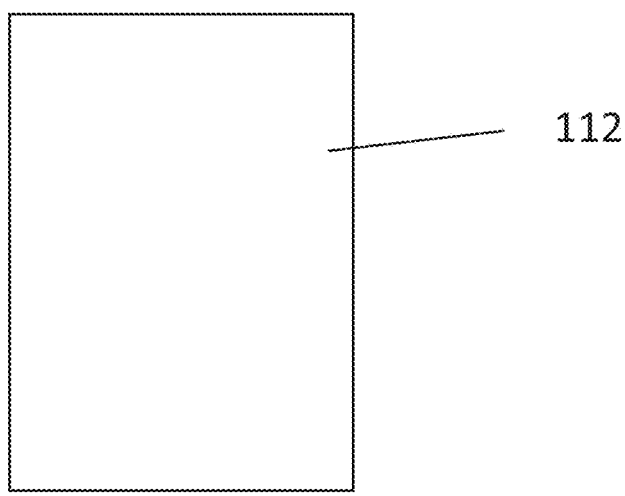
Figure 2B:
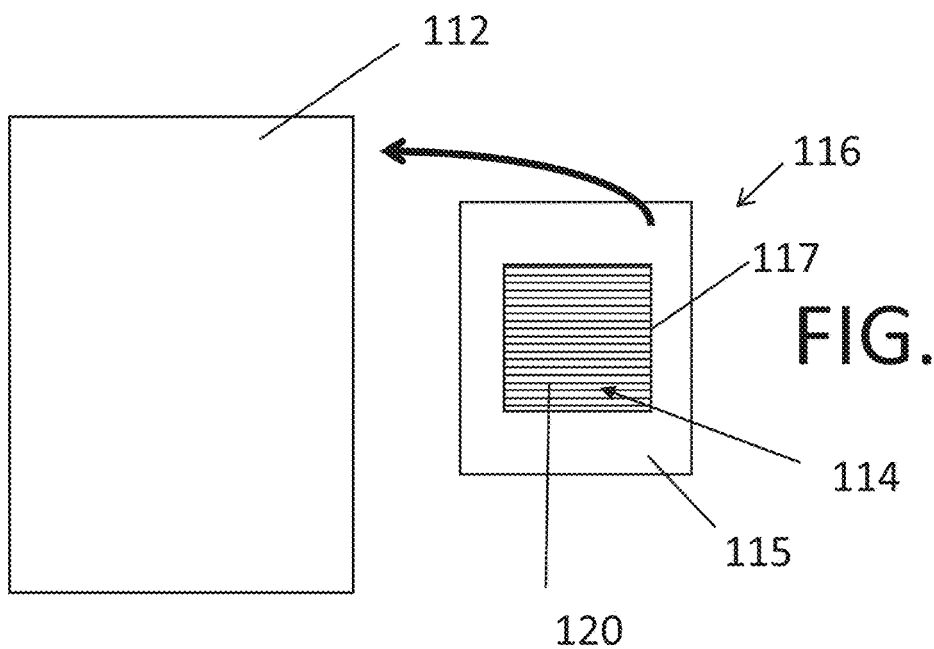
Figure 2C:
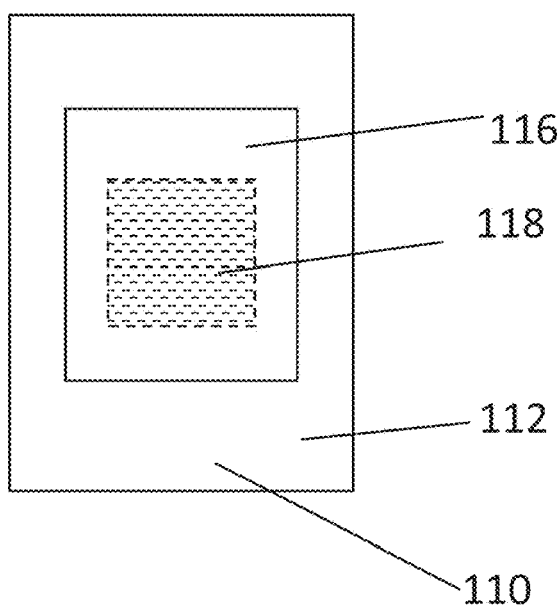
Figure 3A:
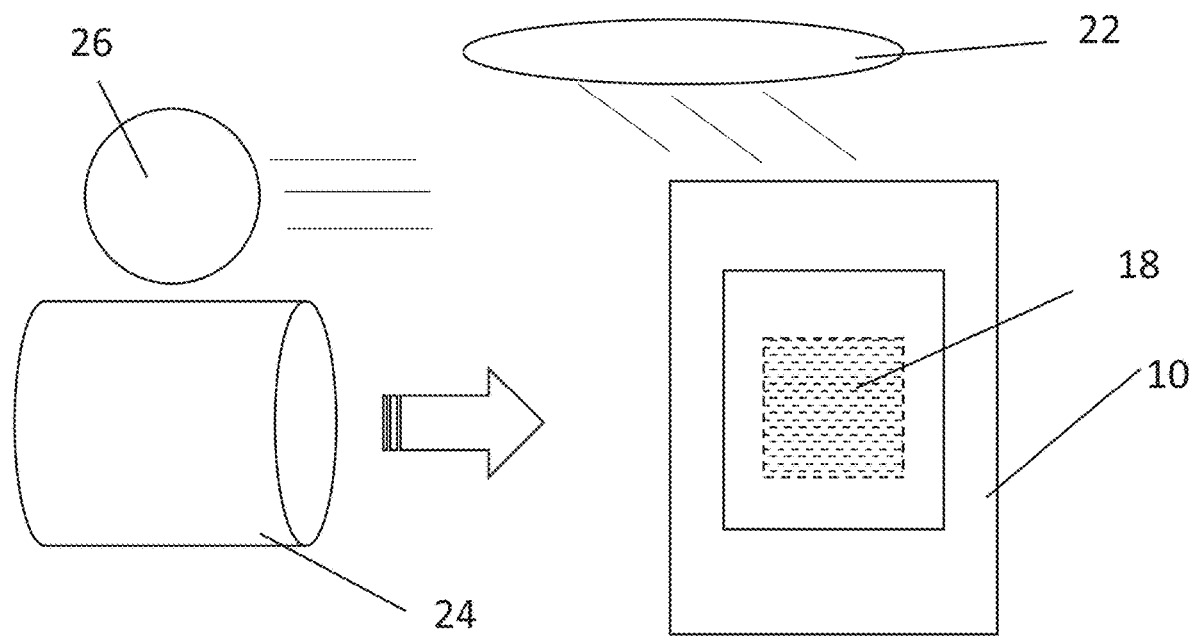
Figure 3B:
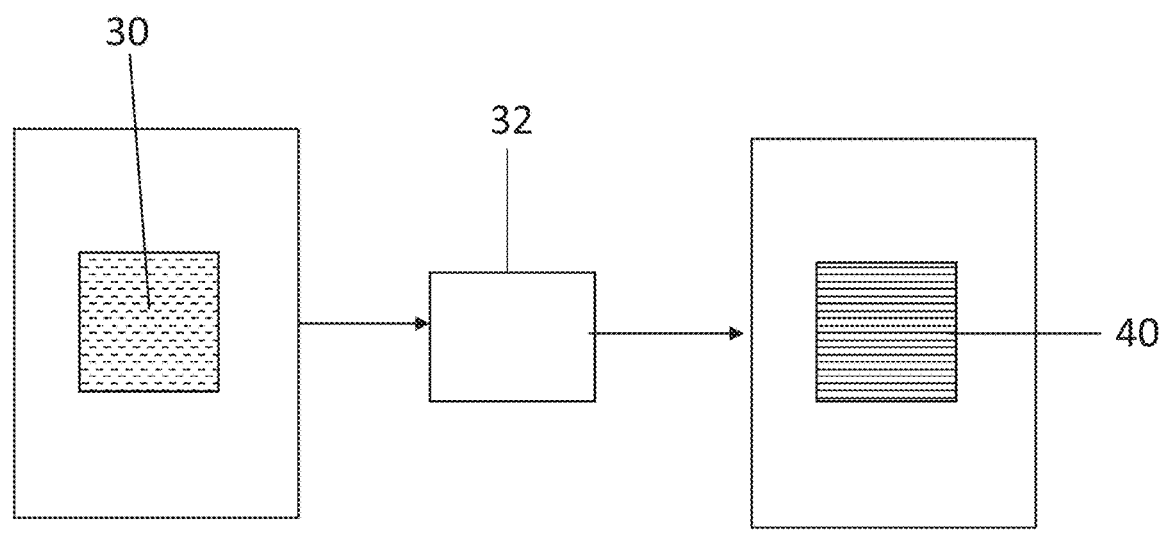
Figure 18A:
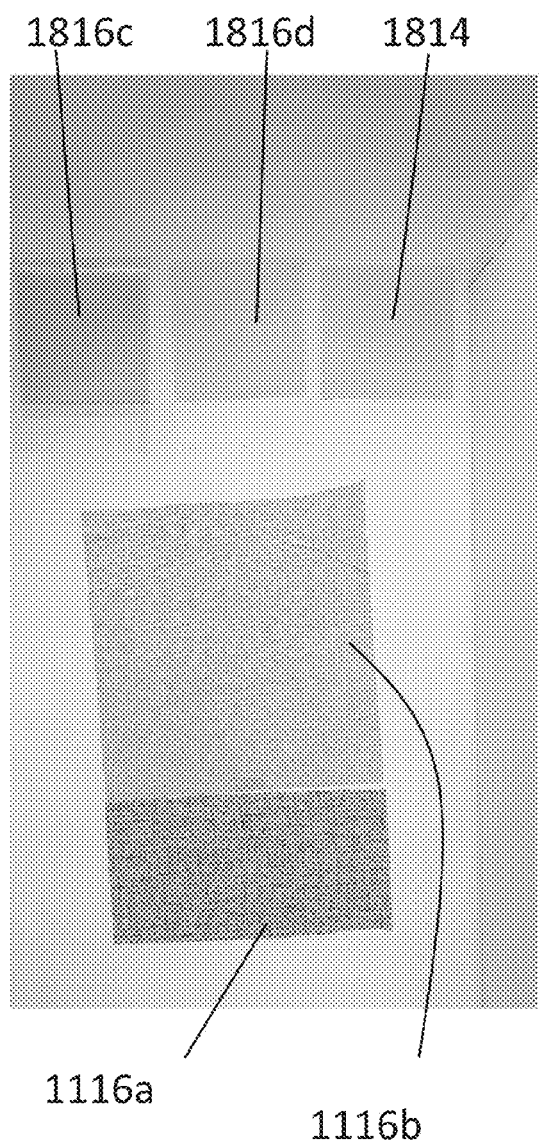
Figure 18B:
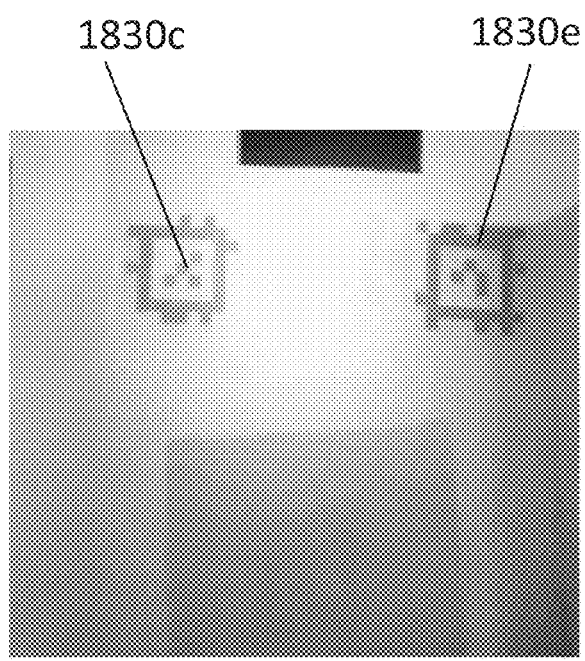

FIG. 3A schematically depicts a method of imaging the infrared pattern formed according to the methods illustrated in FIGS. 1A-1C or 2A-2C, according to embodiments of the present disclosure;

FIG. 3B schematically depicts a process of enhancing an image obtained through the imaging of FIG. 3A, according to embodiments of the present disclosure;

FIGS. 4A-4B, 5A-5D, 6A-6C, 7A-7D, 8A-8C, 9A-9C, 10A-10D, 11, 12A-12C, 13A-13C, 14A-14D, 15A-15G, 16A-16B and 17A-17E depict examples of images obtained when imaging articles formed according to the methods of FIGS. 1A-1C and 2A-2C, including comparisons of images obtained with a visual range image sensor, an infrared image sensor, and enhancements of the images obtained with the infrared sensor, according to embodiments of the present disclosure;

FIGS. 18A-18B depict examples of images obtained when imaging articles formed according to the methods of FIGS. 1A-1C and 2A-2C, including comparisons of images obtained with a visual range image sensor and the same visual range image sensor with an external filter, according to embodiments of the present disclosure; and FIGS. 19A-19F depict an example of a process of forming an article according to the method of FIGS. 2A-2C, and of imaging the article with a visual range image sensor and an infrared image sensor, according to embodiments of the present disclosure.

DESCRIPTION OF SPECIFIC EMBODIMENTS OF THE INVENTION

The present invention, in some embodiments, relates to an article having an invisible infrared pattern, and more specifically, but not exclusively, to an article including a coating overlaid over an infrared pattern, wherein the coating is made of a material and has a thickness that is penetrable by infrared radiation and is substantially opaque to light in the visible range.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring to FIG. 1A, surface 12 is any surface on which it is desired to place a fiducial marker or code. In a typical example, surface 12 is a wall, a ceiling, or a piece of furniture. The surface 12 may be located in an area that is lit principally with fluorescent light, for example, a warehouse. The surface 12 may also be in an area that is lit at least partially with sunlight, or with incandescent light, or in any other area in which at least some infrared spectral content is present. Depending on the composition of the infrared marker that is printed on the surface 12, the area may also be lit with LED lighting, as will be discussed further below.

Referring to FIG. 1B, infrared marker 14 is adhered to surface 12. Infrared marker 14 may be printed onto a backing layer (not shown) which is adhered to surface 12. Alternatively, infrared marker 14 may be printed directly onto surface 12. For example, when surface 12 is a vertical wall, infrared marker 14 may be printed onto surface 12 using a vertical inkjet printer. An advantage of printing infrared marker 14 directly onto surface 12 is that it reduces the thickness of the marker 14, thereby rendering the marker 14 less conspicuous.

Infrared marker 14 is made of an infrared ink or paint. Infrared marker 14 is comprised of two types of regions: dark region 11, depicted in black in FIG. 1B, which has high absorption of infrared radiation at one or more selected infrared wavelengths, and bright region 13, depicted in white in FIG. 1B, which has high reflectivity at the same selected wavelengths. The wavelengths may be selected from any wavelengths in the near infrared range (700-1000 nm) or short wave infrared range (1000-2000 nm). One advantage for wavelengths in the near infrared range is that most CMOS and CCD sensors are sensitive to wavelengths up to 1050 nm. Thus, a conventional CMOS or CCD sensor may be used to image infrared marker 14. Many commercially image sensors typically have infrared cut filters to exclude light in the infrared range; such infrared cut filters must be removed in order to image marker 14. In addition or the alternative, in order to block out visual light, it may be necessary to add an infrared filter to these imagers, for example a filter that blocks all wavelengths up to 720 nm. In exemplary embodiments, the suitable wavelength is 850 nm or 980 nm. These are common wavelengths for which infrared emitters and detectors are commercially available.

Dark region 11 and light region 13 define an infrared pattern. In a preferred embodiment, the dark region 11 and bright region 13 are arranged to form a visual machine code or a fiducial marker. Examples of such visual machine codes include Quick Response (QR) codes, AprilTag™ markers, and ArUCo™ markers.

Infrared markers 14 may be comprised of any suitable materials having the desired absorbance and reflectance properties. Many infrared inks have been developed with various colorants, solvents, and binders. Non-limiting examples of known colorants include phthalocyanine dyes, metal dithiolene complexes, and borides. Non-limiting examples of solvents include organic solvents such as cyclohexanone. Nonlimiting examples of binders include waxes such as polyethylene wax, natural paraffin wax, and carnauba wax, and resins such as ethyl vinyl acetate polymer.

Notably, many common infrared inks are made of organic dyes, which are not colorfast over time. These organic materials degrade due to exposure to sunlight or ambient light, even in indoor conditions. The infrared markers 14 used in the present disclosure may be based on organic materials, and nevertheless remain colorfast over time, because they are covered by coating 16, as will be discussed further below.

Optionally, the material in the bright region 13 is an infrared phosphor that absorbs a small fraction of visible light from ambient illumination, down-converts, and emits in the near infrared range. These types of infrared phosphors are currently known for use in infrared inks. Advantageously, even when the ambient illumination uses a solid-state light source, such as white LEDS, where there is almost no infrared spectral content, the bright regions on infrared markers 14 appear to glow when viewed by an infrared camera. Use of this material thus enables infrared markers 14 to be used in all environments where there is ambient visible light, even if there is no ambient infrared light.

Referring now to FIG. 1C, coating 16 is applied over infrared marker 14 and adhered to surface 12, to thereby produce article 10. Coating 16 may be, for example, a paper, a paint, an ink, a plastic, or a polyvinyl chloride (PVC) wallpaper. In addition, in order to blend with surface 12, coating 16 is preferably of the same color and/or of the same texture as surface 12. Optionally, coating 16 is of the exact same material as surface 12.

As shown in FIG. 1C, coating 16 at least partially obscures the infrared marker 14 when the marker 14 is viewed in visual light. This obscuring is represented by the dashing or blurring of the black lines. The infrared marker in this state is indicated with reference numeral 18.

Coating 16 is made of a material and has a thickness that is penetrable by infrared radiation. Infrared radiation is able to penetrate deeper than visual radiation. The radiation depth of infrared radiation depends on various factors, including the properties of the material being penetrated and the wavelength of the radiation. Typically, infrared radiation penetrates several hundred microns into carbon-based materials such as paper, paint, plastic, and human skin. Accordingly, a thickness of between 50 and 300 μm is typically sufficient to make the coating 16 capable of blocking most visual radiation, while not preventing penetration of infrared radiation. In exemplary embodiments, the thickness is around 200 μm, which is the approximate thickness of a piece of paper.

The material of coating 16 has an average opacity of at least 50 for light in the visible range. As used in the present disclosure, the term "opacity" refers to the extent to which an object or surface impedes the transmission of light through it. A completely opaque object is one which allows no light to pass through it. Opacity is typically quantified as a dimensionless number between 0 and 100, with 0 being a material that allows all light through (i.e., is "transparent"), and 100 being an object that does not permit any light through (i.e., is "opaque"). A material's opacity determines the extent to which an object covered by the material is visible through that material.

The term "average opacity" refers to an average opacity of the coating 16 over the entire surface of the coating 16. Coating 16 need not be of uniform composition. For example, the coating 16 may have a printed pattern, such as a pattern printed by a conventional inkjet printer. The printed pattern may be a dot matrix or "dirt" pattern printed over the entire surface of the coating 16, as shown in the example of coating 1616c in FIG. 16A. These patterns may be recognized by a processor and may be digitally removed during processing of an image. As a result, the opacity of the coating 16 may be, for example, close to zero in areas with a printed pattern and close to 50 in an area without a pattern. Advantageously, the pattern may further assist in rendering the underlying infrared marker 14 invisible to the naked eye, without impinging on the ability of an imager to detect the infrared marker 14.

Different factors influence the degree of opacity of a material. For example, paper is primarily made of cellulose fibers. The cellulose fibers themselves are transparent, but the piling up of the cellulose fibers in a paper web diffuses the light passing through the sheet. Fillers such as clay, titanium dioxide, and calcium carbonate are added to increase the diffusion of light through a paper, and thereby increase the paper's opacity. Other factors that increase opacity of paper include tinting and dyeing, and increasing a paper's basis weight, bulk, and coating.

The property of opacity is commercially significant in the manufacture of papers, paints, and plastic coatings. For this reason, different tests and standards, typically product specific or industry specific, have been developed for quantifying opacity. For example, the measurement of a paper's opacity is accomplished using either the contrast ratio method (TAPPI method T425) or the diffuse opacity (paper backing) method (TAPPI method T519). The contrast ratio method compares the amount of light reflected back through a paper when it is backed by a black sheet of paper to the amount reflected back though a paper when it is backed by a white surface. The diffuse opacity method differs from the contrast ratio method in that the white surface is replaced by a stack of the paper being tested. The diffuse opacity method is most reliable for white or near white papers, and is reliable for colored papers on condition that their reflectance (paper backing) is greater than 20% and their diffuse opacity (paper backing) is greater than 45%. Since the coatings 16 usable with the present disclosure may be colored, for the purposes of the present disclosure, the contrast ratio method may be considered more reliable. A typical opacity of standard printer paper is 90. Higher quality printer paper, such as for photographs and double sided printing, has an opacity of 94-97.

Similar to paper, the opacity of ink or paint coatings is measured by applying the coating onto black and white surfaces, allowing the ink or paint to dry, and comparing the reflectance (Y-tristimulus value) on the two surfaces. Instructions for performing this test are described in ASTM standard D2805. Plastic films may also be subjected to opacity tests. Typically, a sample of the film is held in a machine known as an opacity meter, or an opacimeter. Standards relevant for the measurement of opacity of a plastic film include ASTM standards D589-97, D2103-10, D1746-09, and D1003-11.

As described and illustrated in the Examples below, a standard sheet of paper is sufficient to render the pattern 14 invisible under standard lighting conditions. Furthermore, white PVC thin wallpaper, which from visual examination has an opacity less than that of paper, is equally effective in standard lighting conditions. A tolerance for lower opacities is, in part, influenced by the location of the infrared marker 14. For example, when the infrared marker 14 is located on a ceiling or upper part of a wall, the ambient lighting is typically not very strong, and a viewer is typically several feet away. When viewed from this distance, even a coating 16 with a relatively lower opacity is sufficient to obscure the pattern 14. For this reason, so long as the opacity of a coating is at least 20, the coating is expected to be suitable for the functions described herein.

Coating 16 may be chosen to have other properties in addition to opacity. For example, coating 16 may be comprised of a material that protects the infrared pattern 14 from damage caused by abrasion, organic solvents, moisture, and sunlight. For example, a PVC wallpaper typically provides these protections. These properties enable infrared pattern 14 to remain colorfast over a long period of time.

Referring now to FIGS. 2A-2C, a method of preparing article 110 is disclosed. Article 110 is similar in most respects to article 10, and as a result similar reference numerals are used to refer to similar components, except that the reference numerals are preceded with "1." As shown in FIG. 2A, surface 112 is provided. As shown in FIG. 2B, coating 116 is shown with a rear face 115 exposed. Coating 116 may be, for example, a wallpaper. Rear face 115 may have an adhesive. In addition, infrared marker 114 is shown with rear face 117 exposed. Optionally, infrared marker 114 is printed onto a substrate 120, and the rear face 117 is the rear face of the substrate 120. At FIG. 2C, coating 116 is adhered to surface 112, with the rear face 115 attached directly to the surface 112, to form article 110. In article 110, obscured infrared marker 118 is detectable with an infrared image sensor.

Figure 2D:
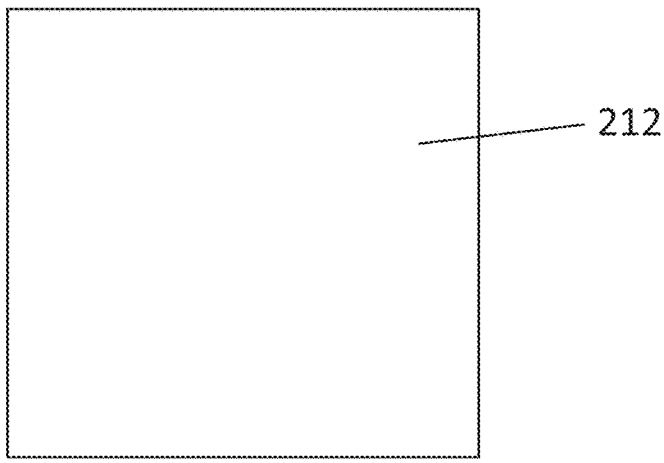
Figure 2E:
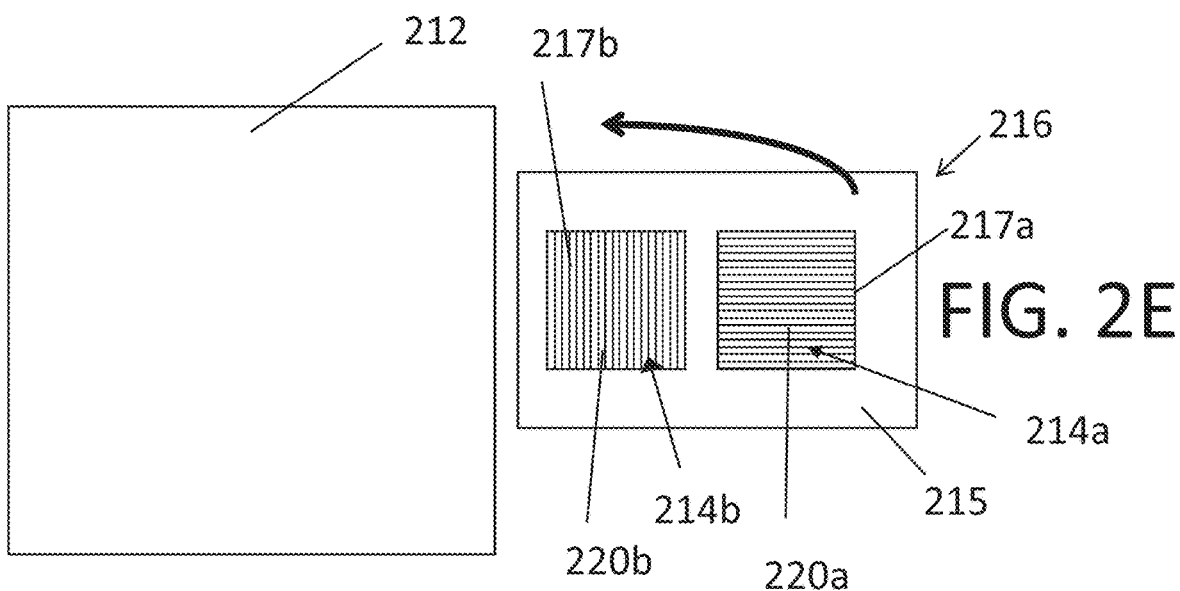
Figure 2F:
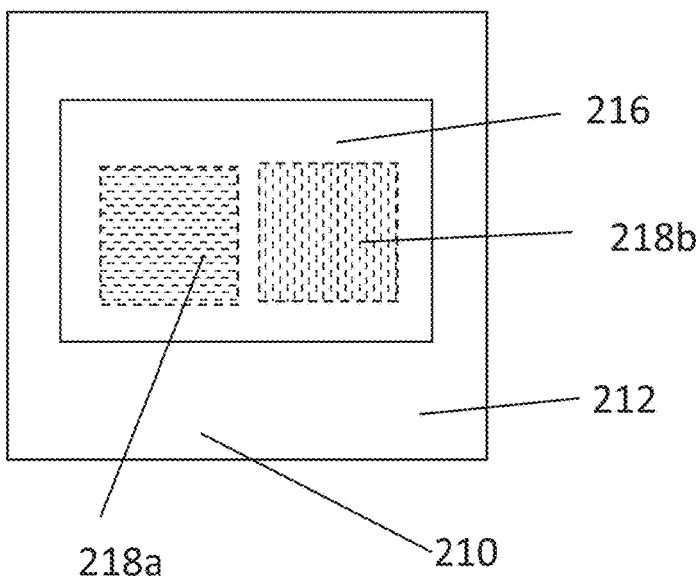

Referring now to FIGS. 2D-2F, a method of preparing article 210 is disclosed. Article 210 is similar in most respects to articles 10 and 110, and as a result similar reference numerals are used to refer to similar components, except that the reference numerals are preceded with "2." Article 210 differs from article 110 in that coating 116 is a roll of wallpaper with two infrared markers 214a and 214b adhered to rear face 215. Each infrared marker 214a, 214b has a rear face 217a, 217b, respectively, and optionally is printed on a substrate 220a or 220b. When coating 216 is adhered to surface 212, two obscured infrared markers 218a, 218b are formed. In the illustrated embodiment, infrared markers 214a, 214b are different from each other, but they may also be identical. In addition, while only two infrared markers 214a and 214b are shown, it is possible to print as many infrared markers on a roll of wallpaper as desired, subject only to limitations of size of the markers and size of the roll of wallpaper. In this way, it is possible to adhere multiple markers a single surface 212 with a single application.

Referring now to FIG. 3A, an apparatus and method for imaging article 10 are schematically depicted. The method is equally applicable to imaging article 110 or 210. Article 10 is located in an environment with ambient light 22. As discussed above, ambient light 22 may be comprised of sunlight, incandescent light, white fluorescent light, and, depending on the composition of infrared marker 14, LED light.

Image sensor 24 images obscured infrared marker 18. The image sensor 24 may be a thermographic camera or any other camera with good sensitivity and a good relative response in the infrared range. Many commercially available cameras meet these criteria, and are usable so long as they do not have an infrared cut filter. As discussed above, image sensor 24 may be a CMOS sensor or CCD sensor, with an infrared cut filter removed, and/or with a filter excluding the visual range. In addition or alternatively, sensor 24 may incorporate a cut-on wavelength filter that increases transmission at or around a specific wavelength in the infrared range.

In one particularly advantageous embodiment, image sensor 24 is a completely standard RGB camera, such as one in a smartphone, with an external longpass infrared filter blocking all radiation below a particular wavelength, such as between 700 and 800 nm. The filter may be as simple as a sticker. As shown in the examples of FIGS. 18A and 18B, using such an image sensor 24, when there is sufficient ambient light, and depending on the processing methods available with the camera (for example, a "night mode" processing on a smartphone camera), it is possible to see the infrared pattern below certain coverings. Advantageously, it is thus possible to take regular imaging devices, of a wide range of size, cost, and nature, and modify them to detect an infrared marker 14 in just a few seconds, using a removable external filter or sticker.

The environment may optionally include radiation emitter 26. Emitter 26 may be operatively connected to image sensor 24, for example, when image sensor 24 is an active infrared sensor. Emitter 26 is able to project light in the infrared or visual ranges onto article 10. Optionally, emitter 26 sequentially projects time-modulated near infrared radiation, short wave infrared radiation, or visible illumination. This projected radiation enhances the detectability of obscured infrared marker 18 in darker environments.

Referring to FIG. 3B, infrared sensor 24 obtains raw image 30 of obscured infrared marker 18. Typically, and as illustrated in the Examples below, raw image 30 lacks the same clarity as a corresponding image of an uncovered infrared marker 14. For example, if an image of an uncovered infrared marker 14 has a resolution of 100 gray levels, raw image 30 may have a resolution of only 20 gray levels. Accordingly, processor 32 is utilized to digitally enhance the raw image 30. The digital enhancements may be any type of enhancement that is known, or that may become known, for enhancing infrared images. These may include, for example, contrast enhancement, edge sharpening, median filtering, histogram stretching, and image subtraction. Image subtraction may include comparing at least one image of the article 10 obtained with projected infrared radiation with a corresponding image of the article 10 obtained with ambient or projected visible illumination, and filtering out the image obtained with ambient or projected visible illumination. The digital enhancement may occur in two or more sequential steps. As a result of the digital enhancement, enhanced image 40 is produced. Based on the enhanced image 40, processor 32 is able to decode the visual machine code or fiducial marker that is encoded in infrared marker 14.

For example, when the infrared marker 14 is an AprilTag™, the decoding may involve determining a three-dimensional pose of the image sensor 24 or of a moving item relative to the infrared marker 14, for example by using a 3×3 homography matrix, in the manner known to those of skill in the art. When the infrared marker 14 is a QR code, the decoding may involve converting certain sub-sections of the code into alphanumeric characters, using algorithms such as Reed Solomon error correction, in the manner known to those of skill in the art.

Processor 32 may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the processor 32, partly on the processor 32, as a stand-alone software package, partly on the processor 32 and partly on a remote computer or entirely on the remote computer or server. In the latter scenario, the remote computer may be connected to the processor 32 through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

EXAMPLES

The principles elucidated above were implemented in the following, non-limiting examples.

Example 1

Figure 4A:
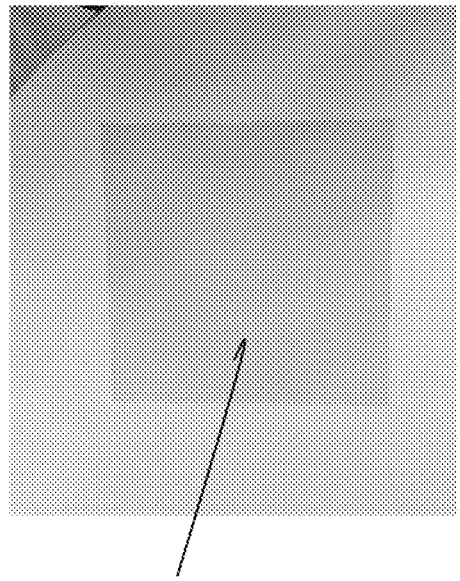
Figure 4B:
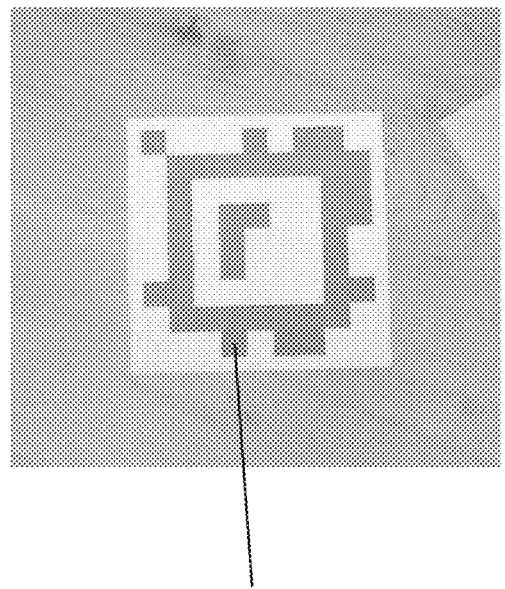

FIG. 4A depicts an image of uncovered infrared marker 414. Infrared marker 414 is made of infrared paint, and encodes an AprilTag™ code. Image 414 was obtained with an RGB camera, installed in a Samsung S9 Galaxy® smartphone, with an IR cut filter (hereinafter, "the smartphone camera"). The area was lit with ambient artificial fluorescent lighting. FIG. 4B depicts an image 430 of the same marker 414 imaged in the same artificial fluorescent lighting. A SiOnyx Aurora Sport™ RGB camera (hereinafter, the SiOnyx camera) was used, with the IR cut filter removed and an IR longpass filter introduced, having a cut-on wavelength (50% transmission) at 850 nm (hereinafter, an "850 nm longpass filter"). The AprilTag™ code is clearly visible.

Example 2

Figure 5A:
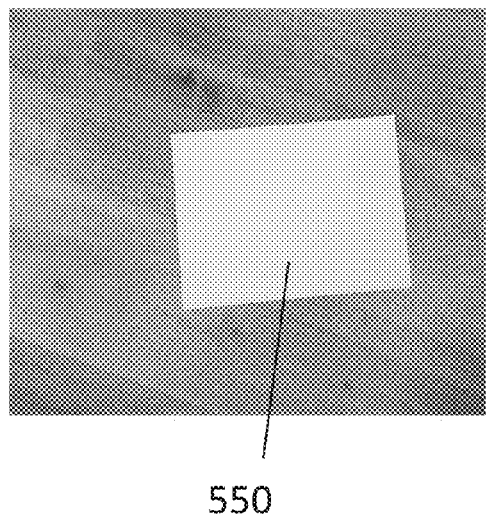
Figure 5B:
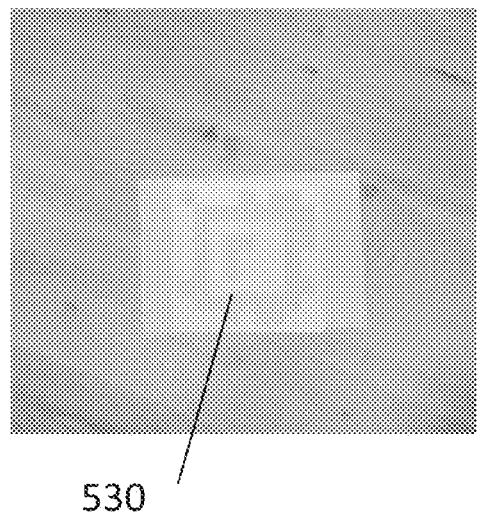
Figure 5C:
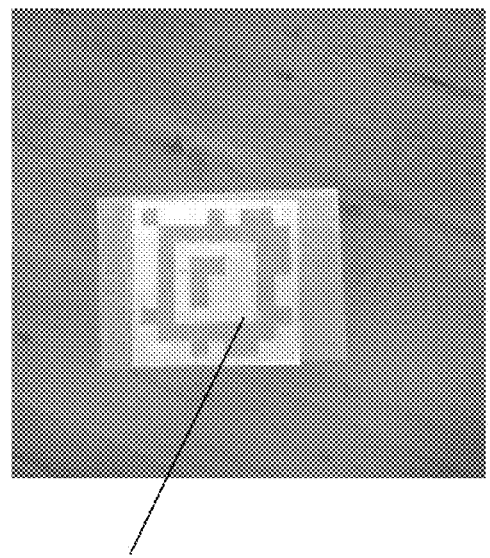
Figure 5D:
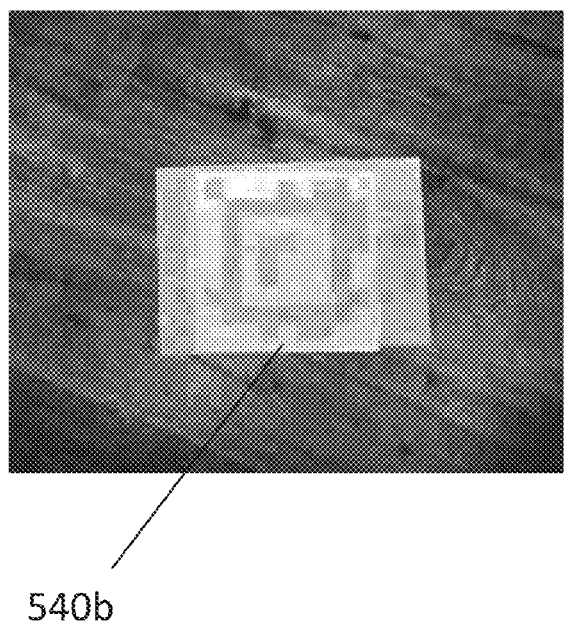

FIG. 5A depicts an image 550 of the same infrared marker of FIGS. 4A and 4B, covered by a piece of standard A4 printer paper. Image 550 was obtained with the smartphone camera. FIG. 5B depicts a raw image 530 of the same infrared marker and paper imaged with the SiOnyx camera having the 850 nm longpass filter. The AprilTag™ code is clearly visible, although not with the same sharpness as the image of the uncovered tag obtained in FIG. 4B. Raw image 530 was digitally enhanced to obtain image 540a in FIG. 5C and image 540b in FIG. 5D. Specifically, for image 540a, the raw image 530 was split to its CMYK components, the magenta channel was selected, and the resulting image was histogram stretched. For image 540b, the raw image 530 was split into its CMYK components, the magenta channel was selected, and image subtraction was performed between the selected channel and the raw image 530. These two forms of enhancement are examples of simple processing methods that may be employed to enhance images; many others may be applied as well. As can be seen, both methods of enhancement resulted in increased clarity.

Example 3

Figure 6A:
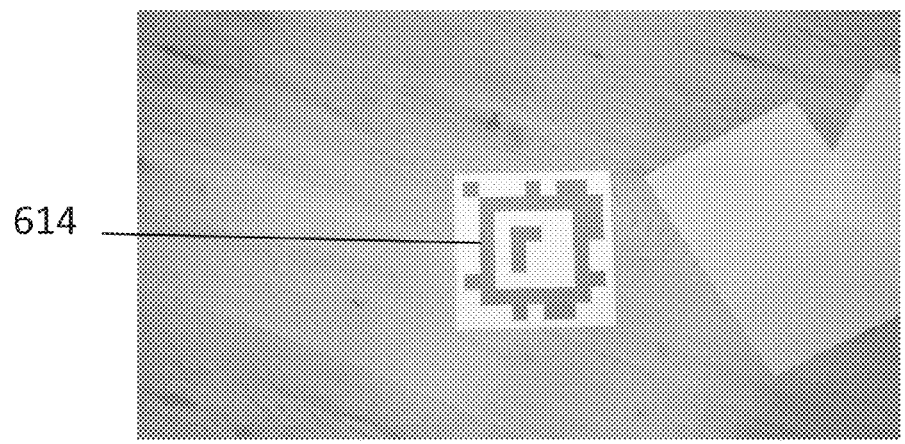
Figure 6B:
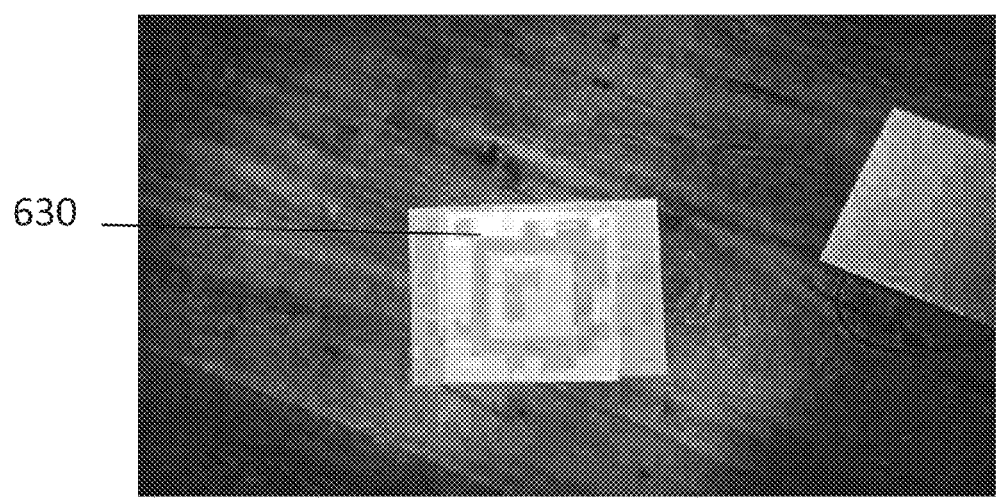
Figure 6C:
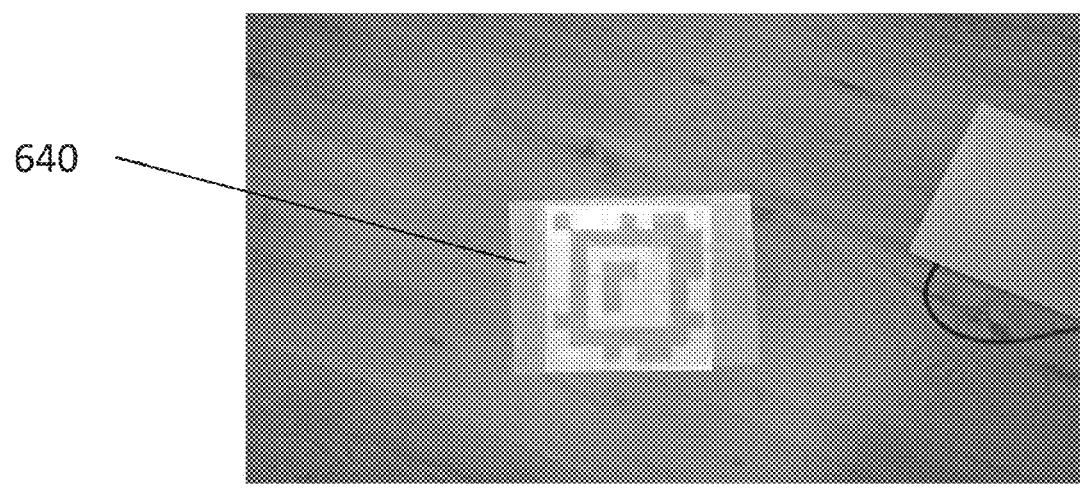

FIG. 6A is another view of the uncovered infrared marker 614 imaged in FIG. 4A. FIG. 6B depicts an enhanced image 640a of the same infrared marker, covered by a sheet of standard A4 paper, with density of 80 gsm, and thickness of 100 microns. FIG. 6C depicts enhanced image 640b, which was taken under the same conditions as image 640a, and enhanced using a different technique.

Example 4

Figure 7A:
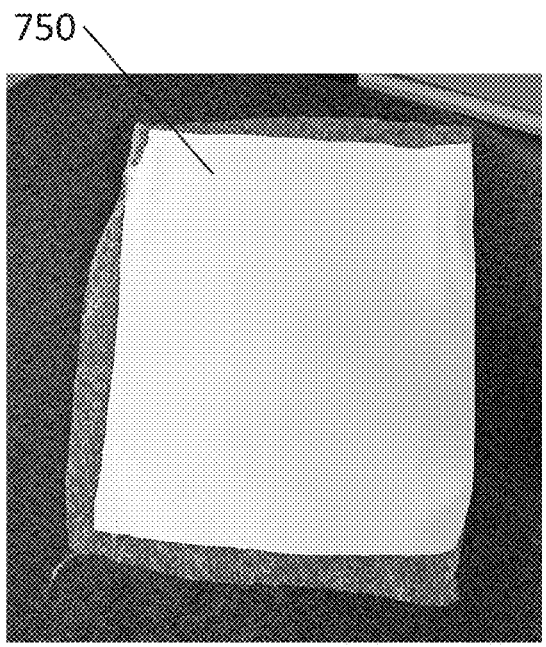
Figure 7B:
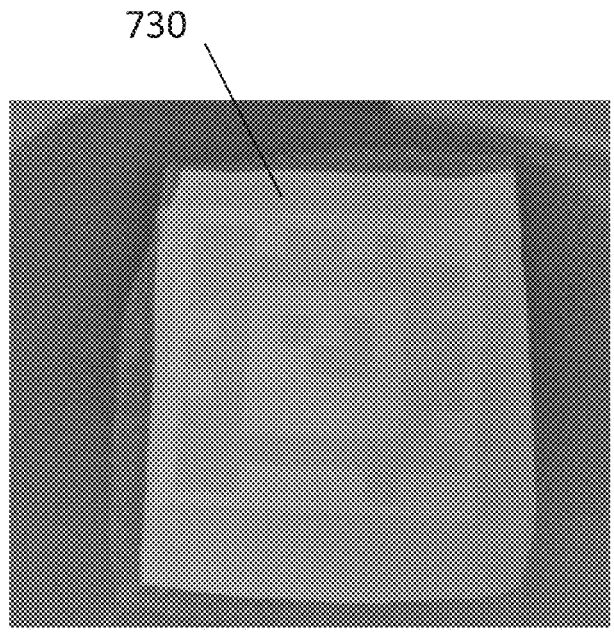
Figure 7C:
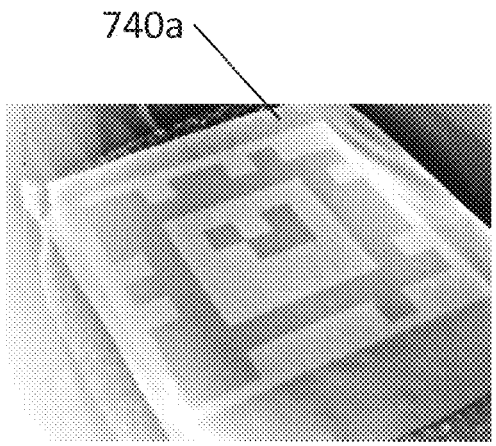
Figure 7D:
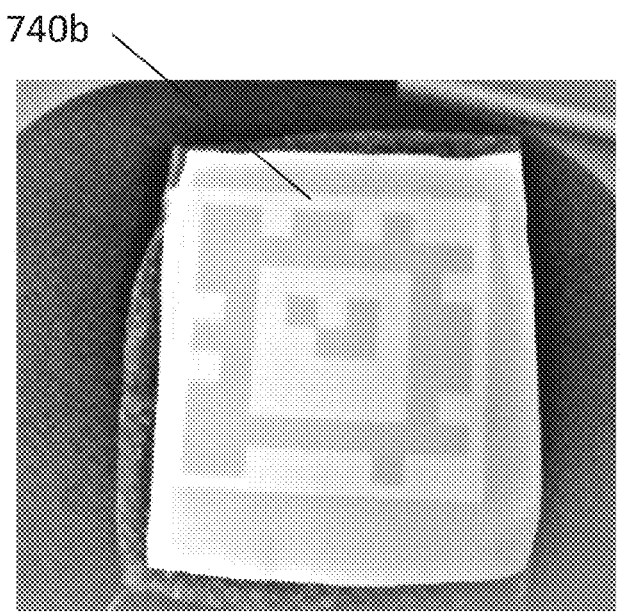

FIG. 7A depicts an image 750 of an article including an infrared marker covered with standard white PVC wallpaper, having a thickness of up to approximately 250 microns. Image 750 was taken by the smartphone camera, indoors, in an area lit with ambient light on a cloudy day. The infrared marker is not visible. FIG. 7B depicts a raw image 730 taken by the SiOnyx camera with an infrared longpass filter having a cut-on wavelength (50% transmission) at 980 nm (hereinafter, "980 nm longpass filter"). FIGS. 7C and 7D depict enhanced images 740a and 740b, respectively, following processing of raw image 730 with contrast enhancement and sharpening.

Example 5

Figure 8A:
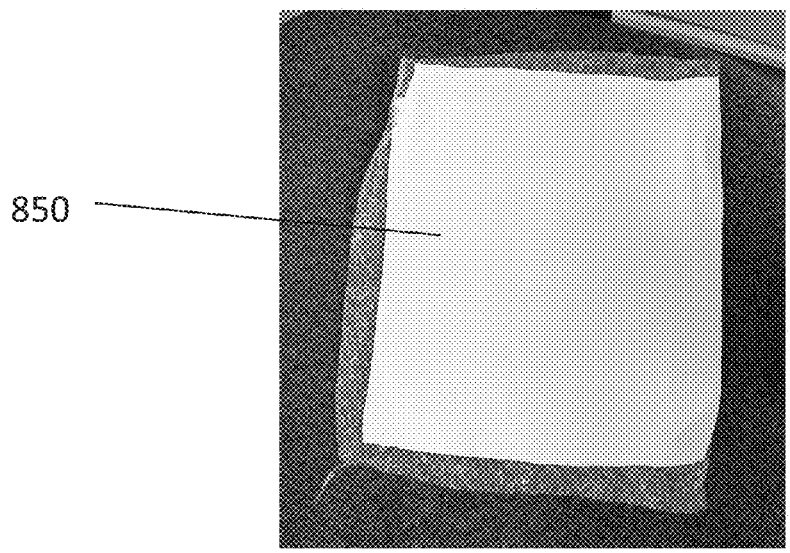
Figure 8B:
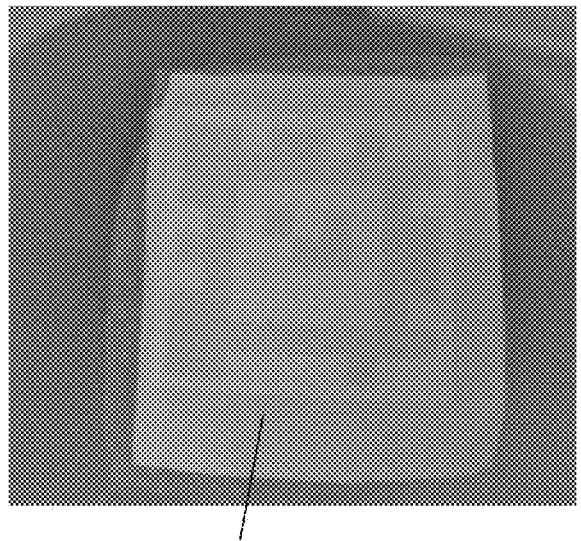
Figure 8C:
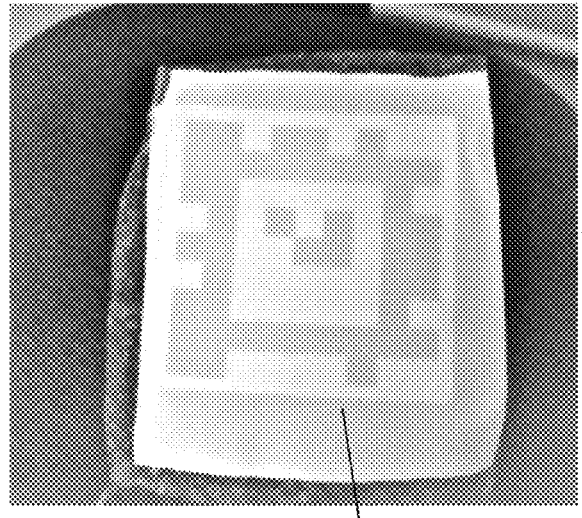

Example 5 used the same experimental materials as Example 4, except that the lighting was white fluorescent indoor light. FIG. 8A shows image 850 obtained by the smartphone camera. FIG. 8B shows the raw image 830 taken by the SiOnyx camera with 980 nm longpass filter, and FIG. 8C shows enhanced image 840, following processing of raw image 830 with contrast enhancement and sharpening.

Example 6

Figure 9A:
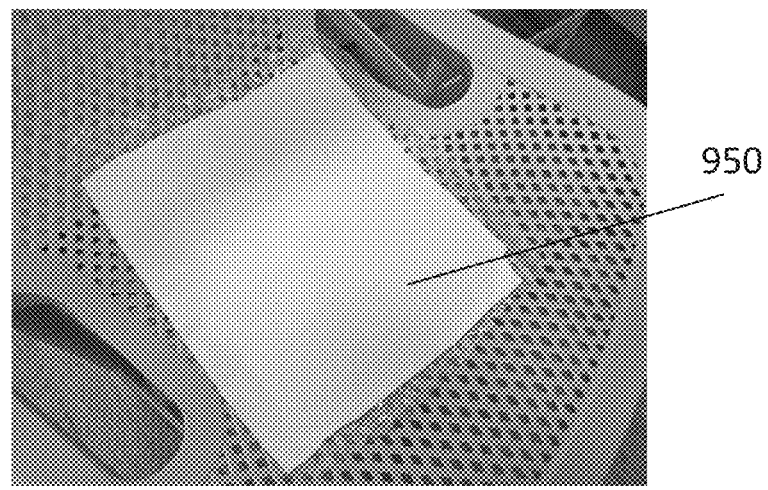
Figure 9B:
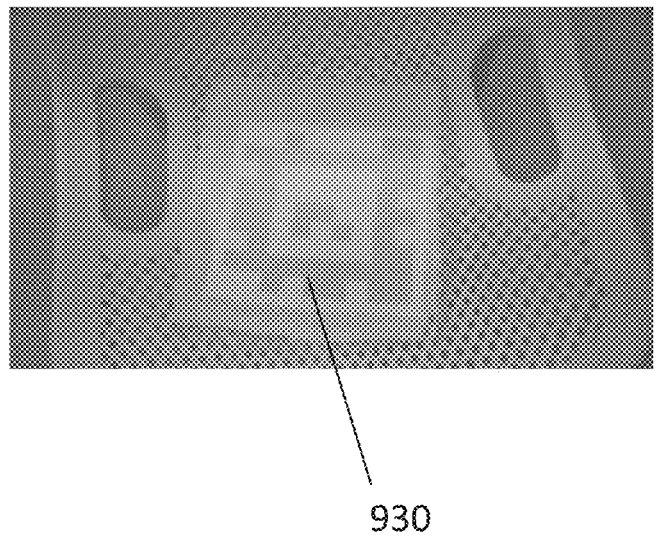
Figure 9C:
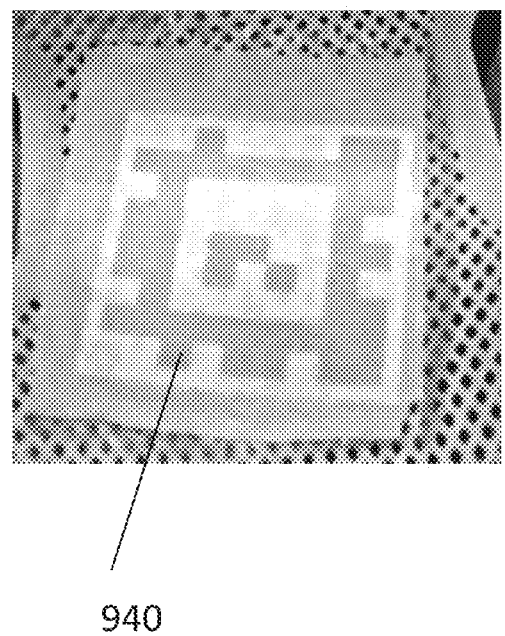

Example 6 used the same experimental materials as Examples 4 and 5, except that a different cut-on filter was used. FIG. 9A shows image 950 obtained by the smartphone camera, lit with white fluorescent indoor light. FIG. 9B shows raw image 930 taken by the SiOnyx camera with the 850 nm longpass filter. FIG. 8C shows enhanced image 40, following processing of raw image 930 with contrast enhancement and sharpening.

Example 7

Figure 10A:
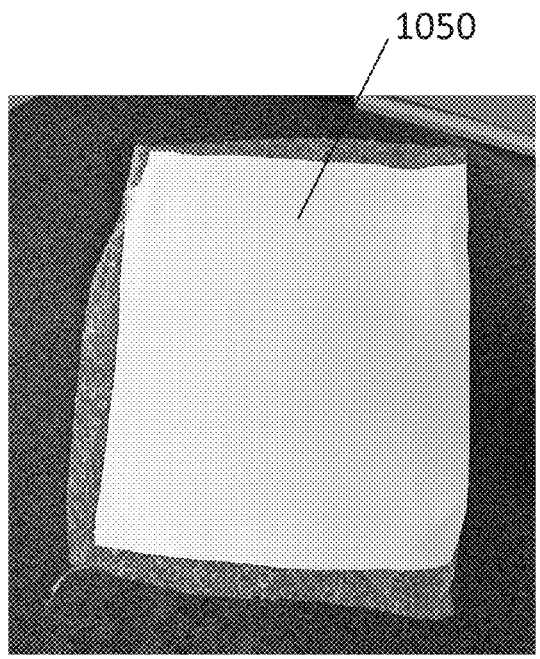
Figure 10B:
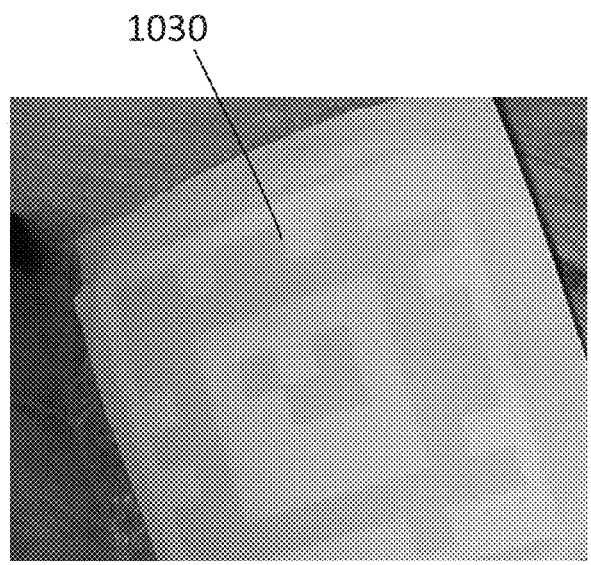
Figure 10C:
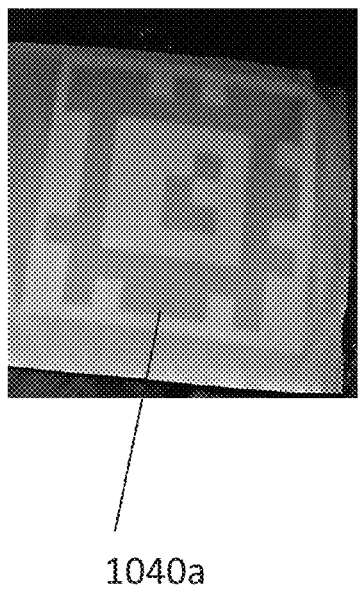
Figure 10D:
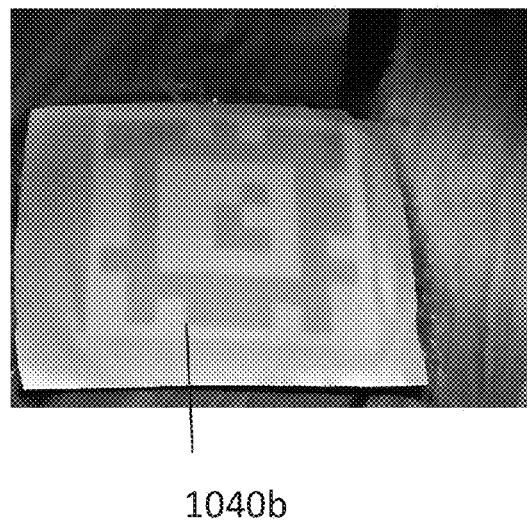

Example 7 used the same experimental materials as Example 6, with a different image sensor. FIG. 10A shows image 1050 obtained by the smartphone camera, lit with white indoor fluorescent light. FIG. 10B shows raw image 1030 taken by a Sony IMX271 CMOS image sensor (hereinafter, "the IMX271 image sensor") with an 850 nm longpass filter. FIGS. 10C and 10D depict enhanced images 1040a and 1040b, respectively, following processing of raw image 1030 with contrast enhancement and sharpening.

Figure 11:
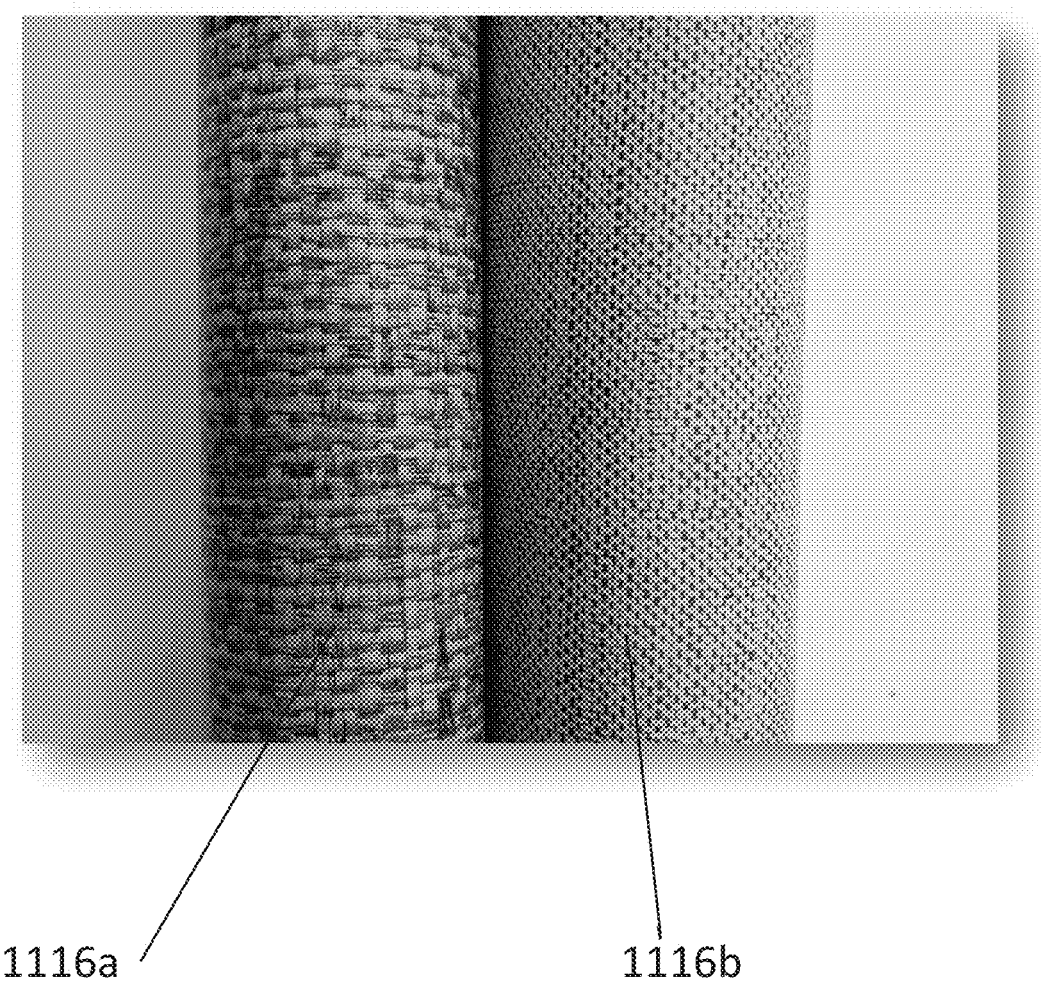

FIG. 11 depicts two types of commercially available thin PVC wallpaper, having an approximate thickness of 250 microns or less. Wallpaper 1116a is heavily patterned, and wallpaper 1116b is more lightly patterned. Both wallpapers 1116a and 1116b are typically used on furniture or upper walls or ceilings which are not continuously contacted. Wallpapers 1116a and 1116b are used in the following Examples.

Example 8

Figure 12A:
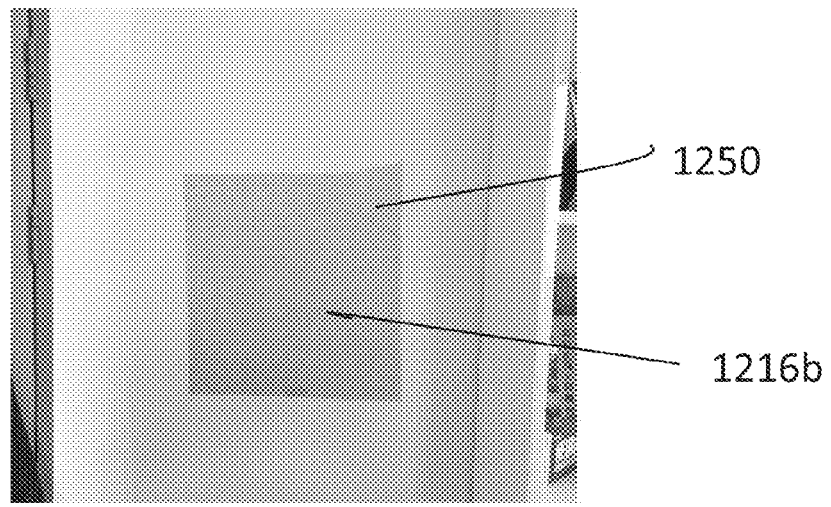
Figure 12B:
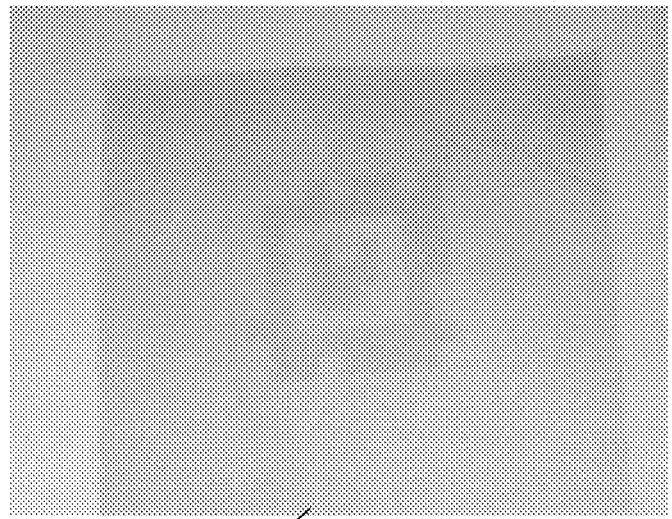
Figure 12C:
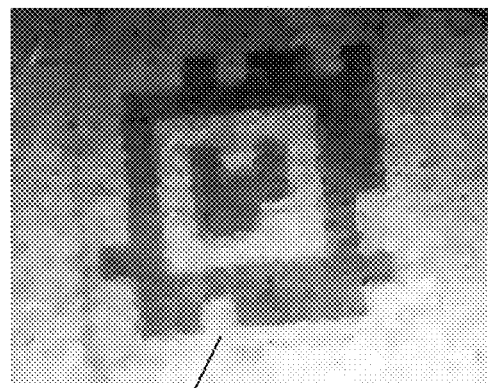

FIG. 12A depicts an image 1250 of an article including an infrared marker covered with wallpaper 1116b. Image 1250 was taken with the smartphone camera, indoors, in an area lit with white fluorescent light. The infrared marker is not visible. FIG. 12B depicts a raw image 1230 taken by the IMX271 image sensor with an 850 nm longpass filter. FIG. 12C depicts enhanced image 1240, following processing of raw image 1230 with contrast enhancement and sharpening.

Example 9

Figure 13A:
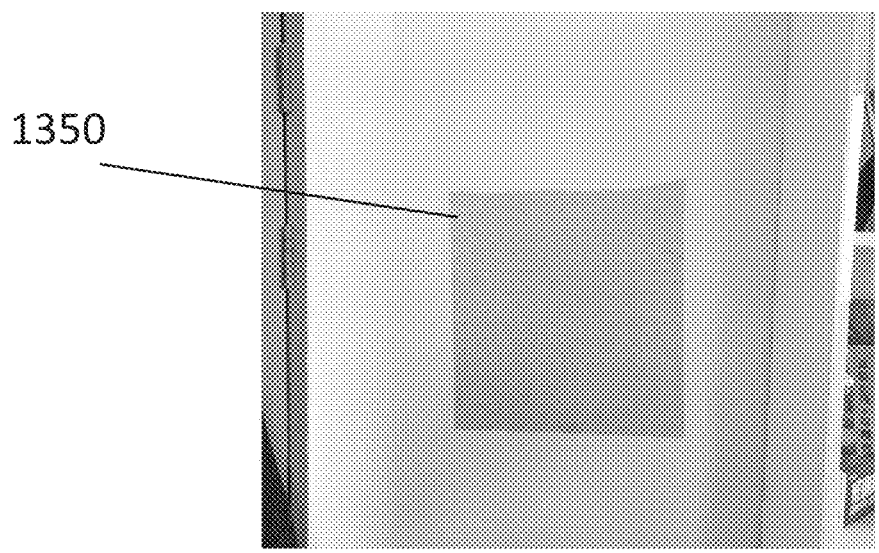
Figure 13B:
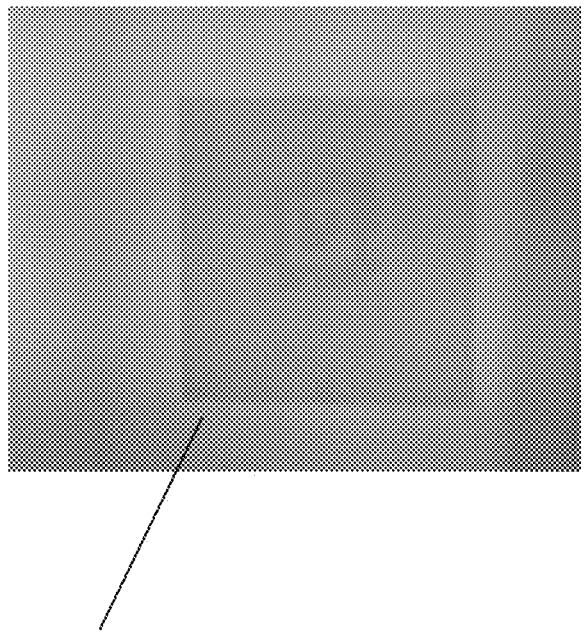
Figure 13C:
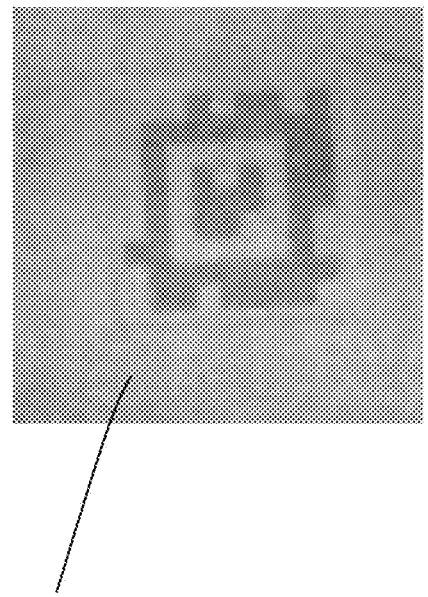

Example 9 uses the same experimental materials as Example 8, but with a different image sensor. FIG. 13A shows image 1350 obtained by the smartphone camera, lit with white indoor fluorescent light. FIG. 13B shows raw image 1330 taken by the SiOnyx camera having an 850 nm longpass filter. FIG. 13C depicts enhanced image 1340, following processing of raw image 1330 with contrast enhancement and sharpening.

Example 10

Figure 14A:
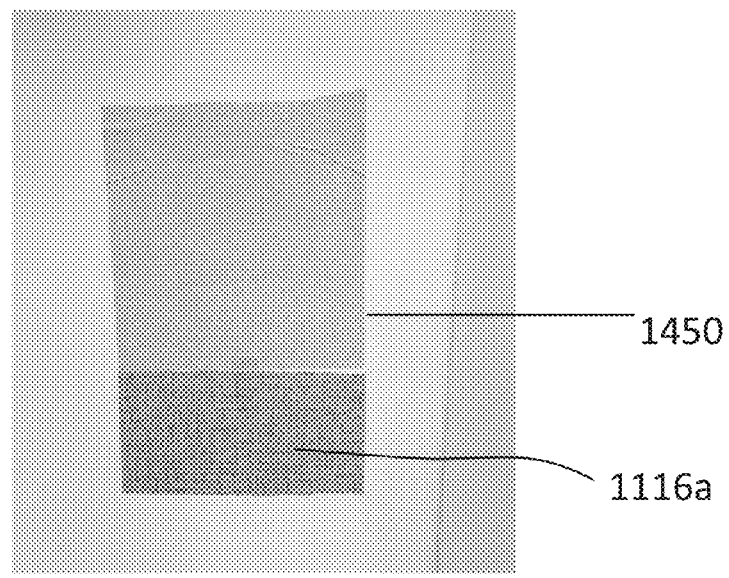
Figure 14B:
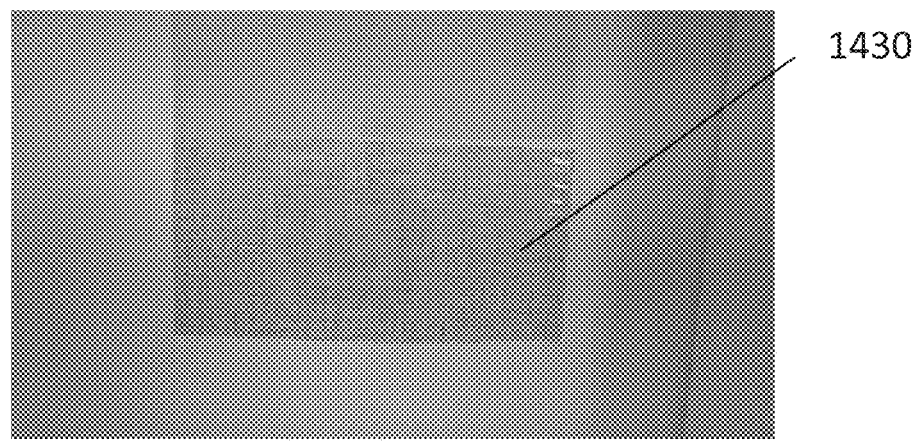
Figures 14C, 14D:
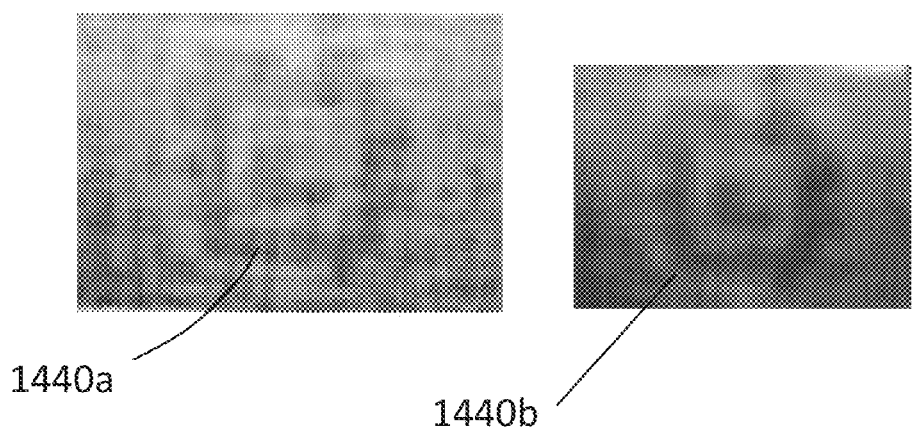

FIG. 14A depicts an image 1450 of an article including an infrared marker covered with wallpaper 1116a. Image 1450 was taken by the smartphone camera, indoors, in an area lit with white fluorescent light. The infrared marker is not visible. FIG. 14B shows raw image 1430 taken by the SiOnyx camera having an 850 nm longpass filter. FIGS. 14C and 14D depict enhanced images 1440a and 1440b, respectively, following processing of raw image 1430 with median filtering, contrast enhancement, and sharpening.

Example 10

Figure 15A:
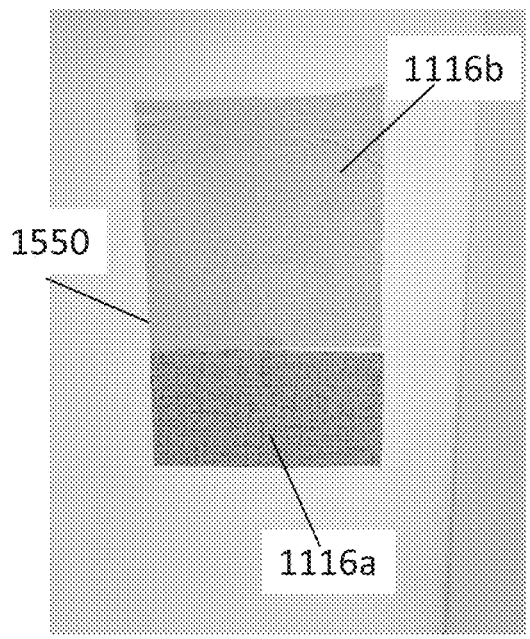
Figure 15B:
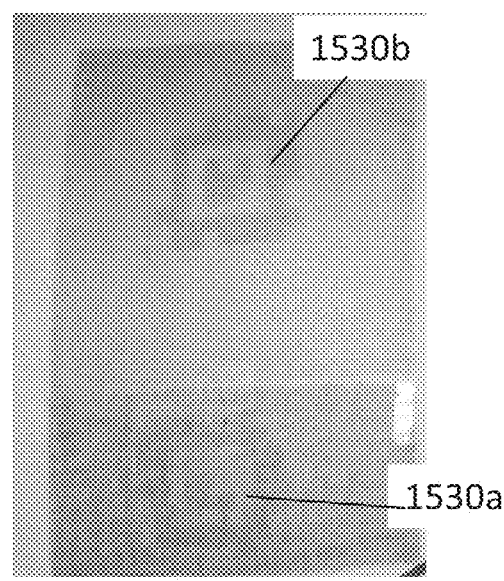
Figure 15C:
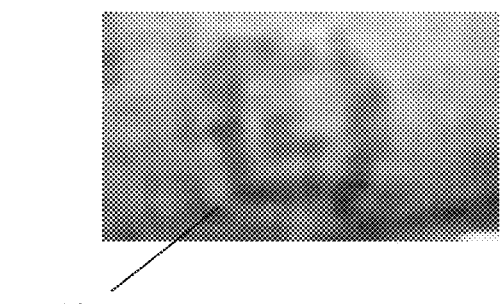
Figure 15D:
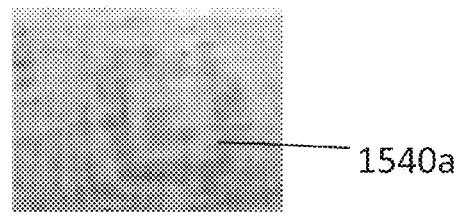
Figure 15E:
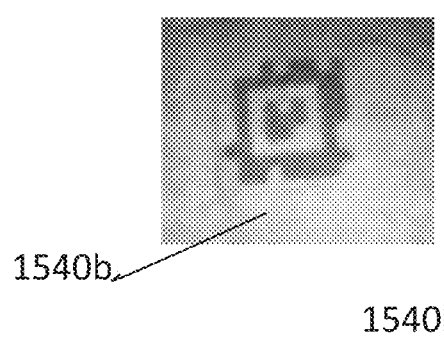
Figure 15F:
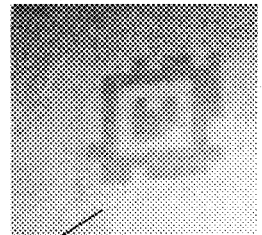
Figure 15G:
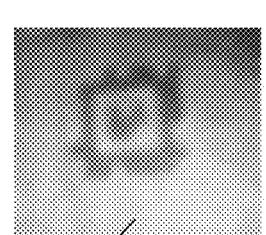

FIG. 15A depicts an image 1550 of article including one infrared marker covered with wallpaper 1116a and a second infrared marker covered with wallpaper 1116b. Image 1550 was taken with the smartphone camera, indoors, in an area lit with white fluorescent light. The infrared markers are not visible. FIG. 15B depicts raw images 1530a and 1530b taken by the IMX271 image sensor with an 850 nm longpass filter. FIGS. 15C and 15D show two views of enhanced image 1540a, following processing of raw image 1530a with contrast enhancement and sharpening. FIGS. 15E, 15F and 15G show three views of enhanced image 1540b, following processing of raw image 1540b with contrast enhancement and sharpening.

Example 11

Figure 16A:
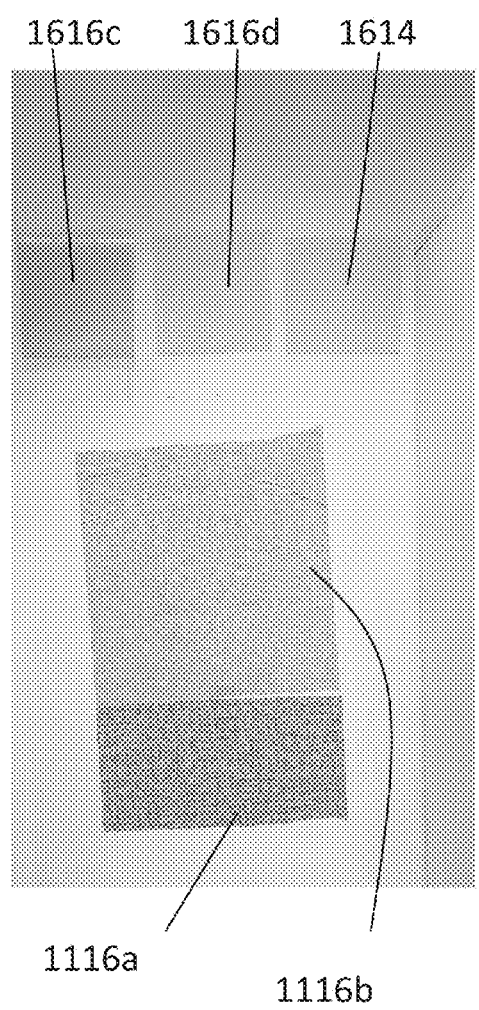
Figure 16B:
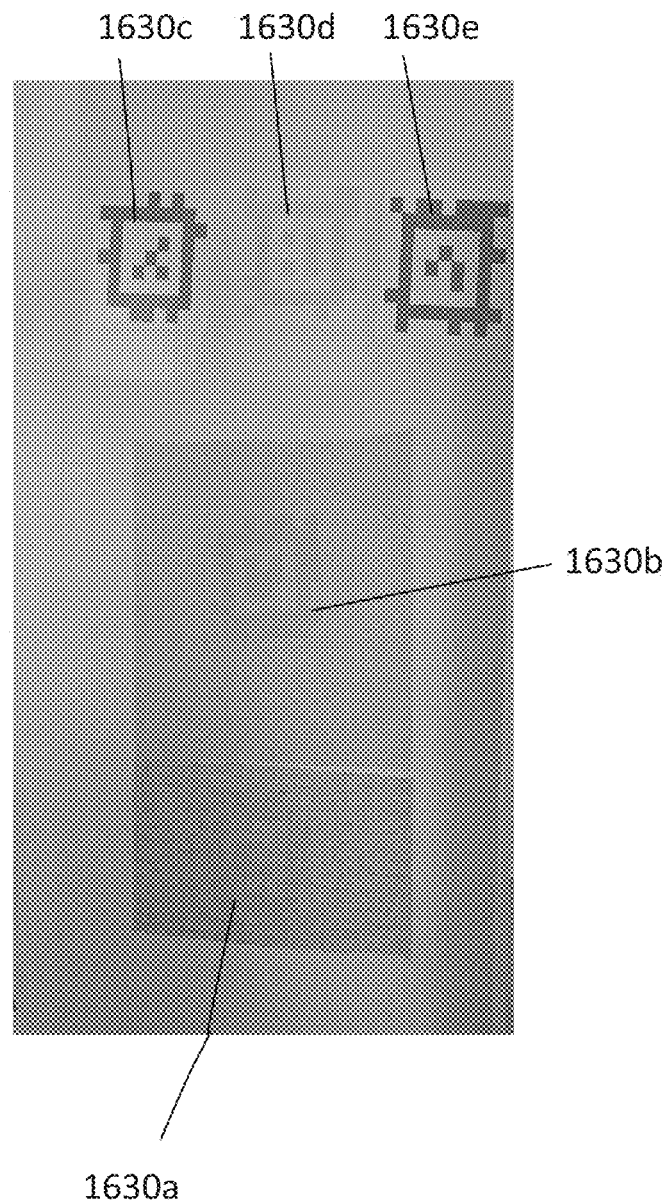

FIGS. 16A and 16B show five different infrared markers on the same surface and imaged under the same conditions.

Referring to FIG. 16A, infrared marker 1614 is uncovered. A second infrared marker is covered with wallpaper 1116a, and a third infrared marker is covered with wallpaper 1116b. A fourth infrared marker is covered with coating 1616c, which is a transparent sticker overlaid with an inkjet "dirt" (i.e., scattered dots) pattern. A fifth infrared marker is covered with coating 1616d, which is a white sticker overlaid with an inkjet dirt pattern. In FIG. 16A, each of these markers is imaged with the smartphone camera. None of the infrared markers is visible. In FIG. 16B, the same surface is imaged with an infrared image sensor having an 850 nm longpass filter. As can be expected, raw image 1630e, of the uncovered infrared marker, is clearest. Raw image 1630c, of the infrared marker with the transparent coating 1616c having the inkjet pattern, is also extremely clear. Raw images 1630a, 1630b, and 1630d, corresponding to markers covered by coatings 1616a, 1616b, and 1616d, respectively, are not as clear. However, they are plainly visible, and their clarity may be improved through digital enhancement, as in the previous Examples.

Example 12

Figure 17A:
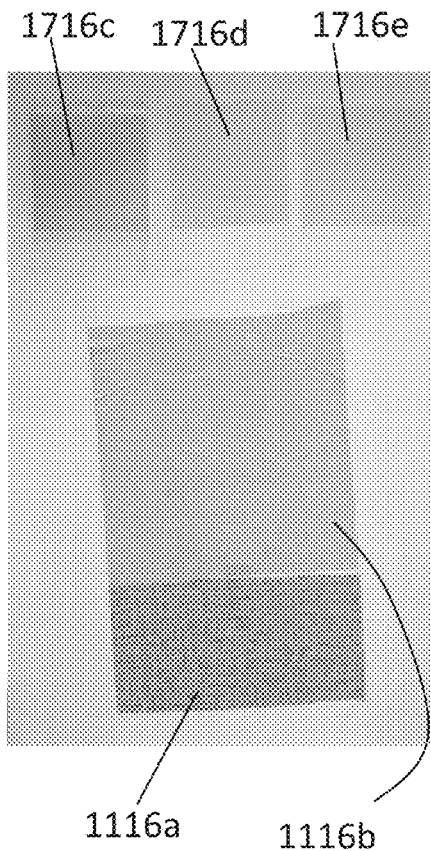
Figure 17B:
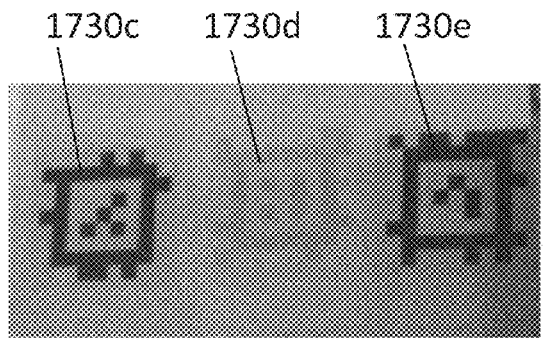
Figure 17C:
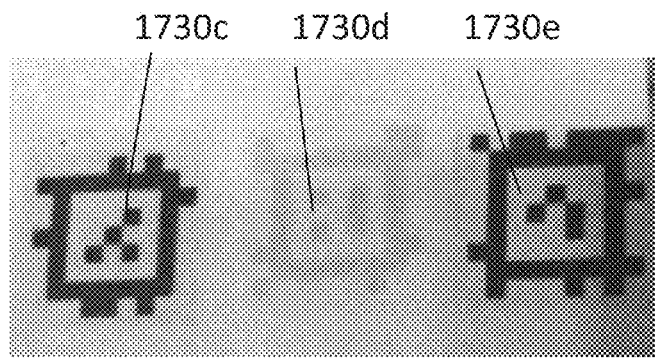
Figure 17D:
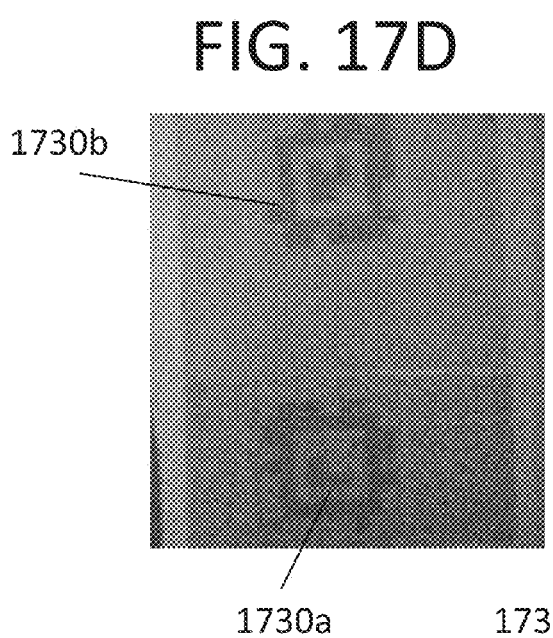
Figure 17E:
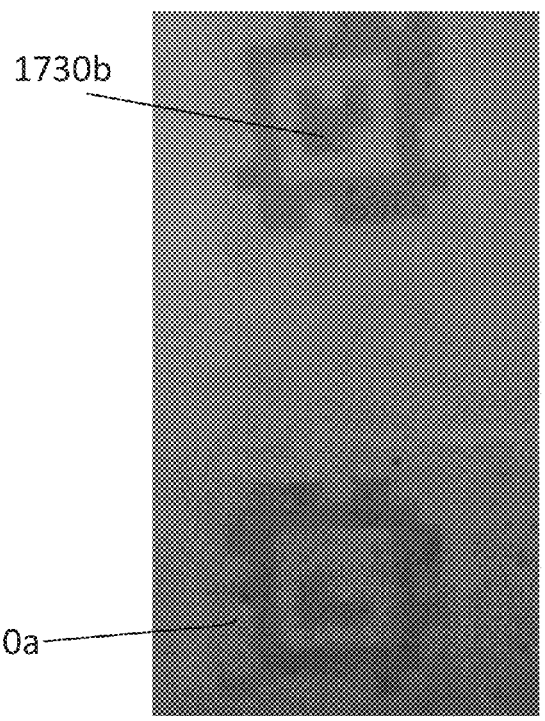

FIGS. 17A-17E depict the same setup of infrared markers as in FIGS. 16A-16B, but under different imaging conditions. FIG. 17A depicts uncovered infrared marker 1714, and infrared markers coated with wallpaper 1116a, 1116b, transparent coating with pattern 1716c, and white coating with pattern 1716d. The display was imaged with the smartphone camera lit with sunlight. In FIGS. 17B-17E, the display was imaged with a shortwave infrared imager having a filter at 1300 nm. Similar to the results of FIG. 16B, the raw images 1730c and 1730e are extremely clear, as shown in FIGS. 17B and 17C. Raw images 1730a and 1730b, shown in FIGS. 17D and 17E, and raw image 1730d, shown in FIGS. 17B and 17C, are not as clear. However, they are plainly visible, and their clarity may be improved through digital enhancement, as in the previous Examples.

Example 13

FIGS. 18A-18B depict the same setup of infrared markers as in FIGS. 16A-16B and FIGS. 17A-17E, but under different imaging conditions. FIG. 18A shows the same uncovered marker 1814 and the same markers coated with coatings 1816a, 1816b, and 1816c, and 1816d, which are identical to the markers in the same locations in the previous examples. The markers were imaged using the smartphone camera under standard indoor lighting. In FIG. 18B, the same markers were imaged with the smartphone having a 720 nm filter, and processed using the "night mode" processing, in the same standard indoor lighting. In particular, in the illustrated image, the blue and red channels are depicted with histogram stretching. The blue channel showed maximum contrast. The infrared patterns were visible in the case of the uncovered pattern 1830e and the pattern 1830c that was covered with a transparent coating with light print. The infrared patterns were not visible in the case of the wallpaper coatings 1116a and 1116b and the white coating 1816d. Example 13 demonstrates that at least for certain coatings, even a smartphone camera with a simple sticker or add-on filter is sufficient for viewing the infrared patterns.

Example 14

Example 14 depicts a process for forming and imaging an article as described above in connection with FIGS. 2A-2C.

Figure 19A:
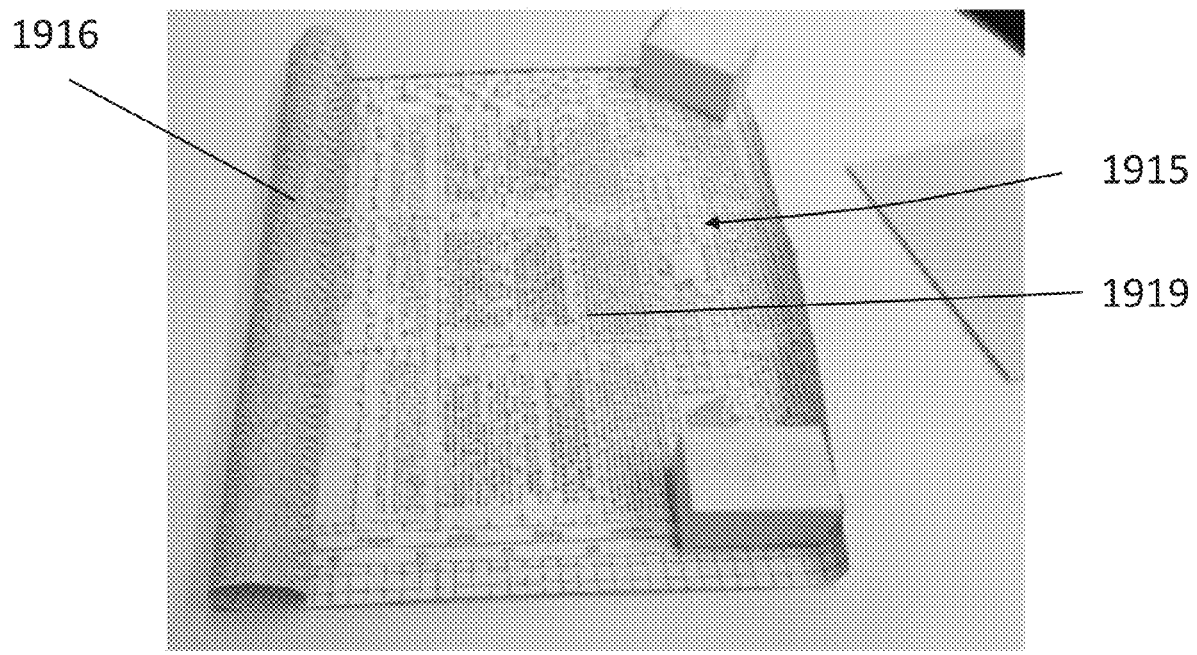

In FIG. 19A, Wallpaper 1916 is shown with its rear face 1915 facing up. The rear face 1915 is covered by protective backing 1919. Protective backing is a standard material used to cover the adhesive of the wallpaper 1916 prior to its application onto a surface.

Figure 19B:
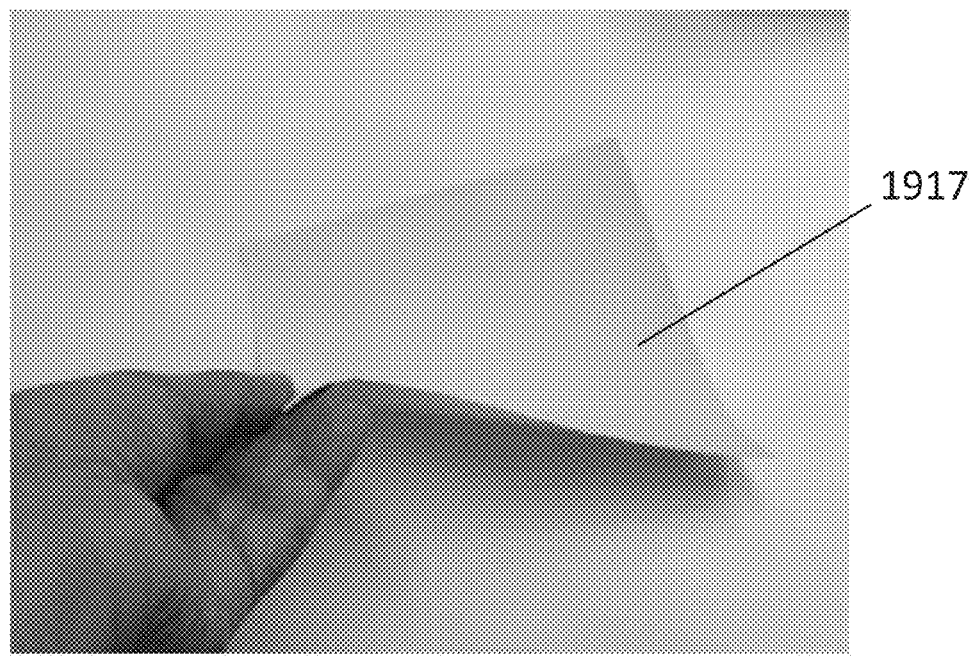
Figure 19C:
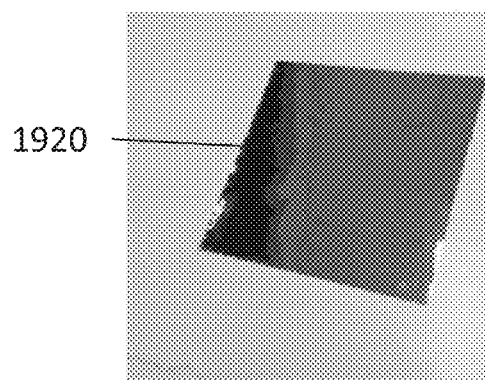

FIG. 19B depicts a thin substrate 1917 on which an infrared pattern is printed, and FIG. 19C depicts an underside 1920 of the same substrate 1917. The image of FIG. 19B was obtained with a standard RGB camera, and as a result the infrared pattern is not visible. Substrate 1917 is approximately 130 microns thick. In the illustrated embodiment, substrate 1917 is a textured aluminum-based substrate, which causes underside 1920 to appear shiny.

Figure 19D:
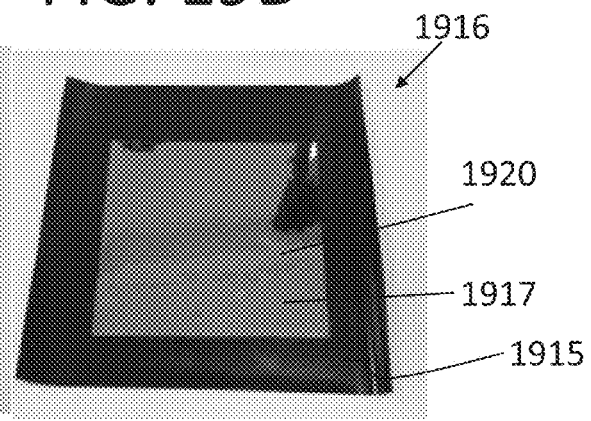

Referring now to FIG. 19D, rear face 1915 of the wallpaper is shown with the protective backing removed. The substrate 1917 is applied to the wallpaper 1916 with the infrared pattern attached directly to the adhesive 1915. Thus, underside 1920 is visible, surrounded by adhesive of the rear face 1915.

Figure 19E:
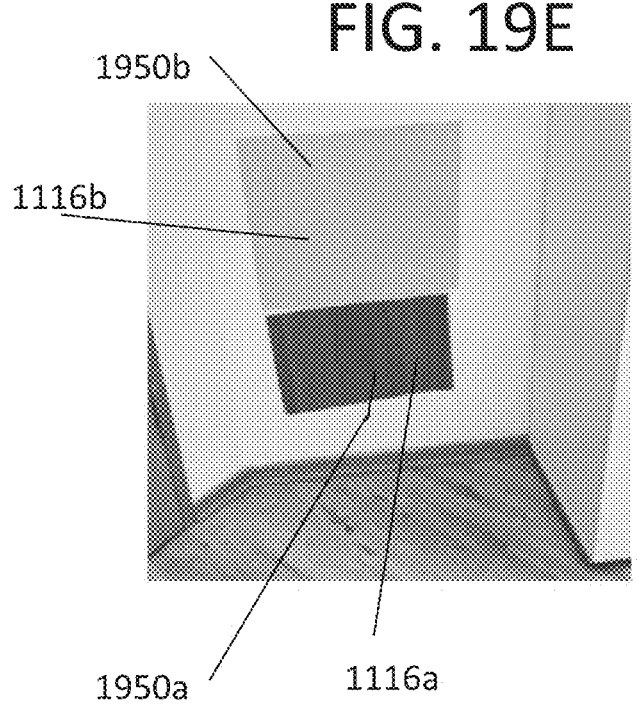
Figure 19F:
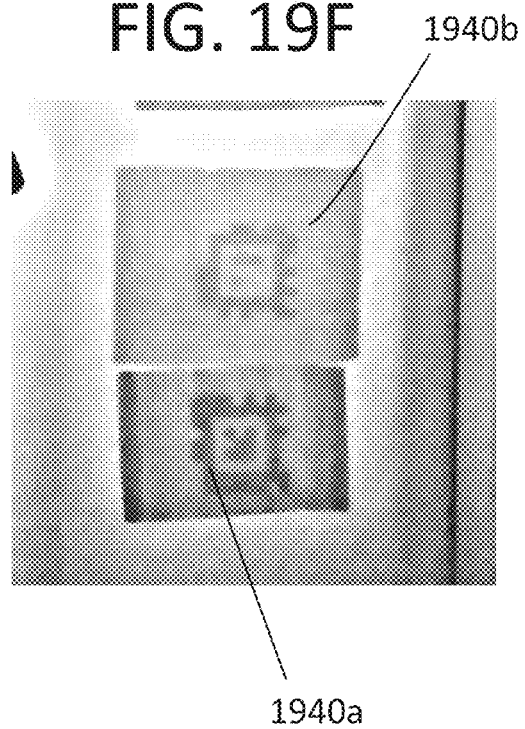

Referring to FIG. 19E, the wallpaper is adhered to a wall in the regular fashion, forming the article as depicted in FIG. 2C. In the illustrated embodiments, two such articles are formed: one with the wallpaper 1116a of FIG. 11, and one with the wallpaper 1116b of FIG. 11. As shown in FIG. 19E, when these articles are imaged with the smartphone camera, images 1950a and 1950b are obtained. The infrared markers remain invisible. FIG. 19F depicts images 1940a and 1940b of the same articles, obtained with an infrared image sensor with an 850 nm longpass filter, and following digital enhancement. The infrared patterns are sufficiently clear to be decoded.

It is expected that during the life of a patent maturing from this application many coatings, paints, inks, and image sensors will be developed that are suitable for the functions described herein, and the scope of the terms coating, paint, ink, and image sensor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An article having at least one invisible infrared pattern, comprising:
    at least one infrared pattern printed onto a surface, the at least one infrared pattern comprising regions of high absorption and high reflection for a plurality of wavelengths of infrared radiation ranging between 700 to 2000 nm; and
    a coating overlaid over the at least one infrared pattern and covers at least a whole area of said at least one infrared pattern, the coating made of a material and having a thickness that is penetrable by infrared radiation and that has an average opacity value of at least 20% for light in the visible range;
    wherein said opacity value is quantified as a dimensionless number between 0% and 100%, which indicates a ratio between amount of light entering said coating and an amount of said light blocked by said coating, with 0% being a transparent material that allows all light through and 100% being an opaque object that does not permit any light through; and
    wherein said at least one infrared pattern is visibly blended with the surface surrounding said at least one infrared pattern by having said coating being comprised of one or more of a paper, a plastic and a polyvinyl chloride wallpaper and said coating being made of a same color as the surface and having a same texture as the surface;
    wherein the at least one infrared pattern is printed onto or adhered to a face of the material of the coating, and the face is adhered to a surface such that the coating is overlaid over the at least one infrared pattern;
    wherein the coating comprises a roll of wallpaper, and the at least one infrared pattern comprises a plurality of infrared patterns printed onto or adhered onto the face of the wallpaper.

2. The article of claim 1, wherein the coating is comprised of a material that protects the at least one infrared pattern from damage caused by abrasion, organic solvents, moisture, and sunlight.

3. The article of claim 1, wherein the thickness is between 50 and 300 microns.

4. The article of claim 1, wherein said coating is made of an exact same material as said surface.

5. A method, comprising:
    Printing on a surface at least one infrared pattern comprising regions of high absorption and high reflection for a plurality of wavelengths of infrared radiation ranging between 700 and 2000 nm; and
    overlaying a coating over the at least one infrared pattern and covers at least a whole area of said at least one infrared pattern, the coating made of a material and having a thickness that is penetrable by infrared radiation and that has an average opacity of at least 20% for light in the visible range;
    wherein said opacity value is quantified as a dimensionless number between 0% and 100%, which indicates a ratio between amount of light entering said coating and an amount of said light blocked by said coating, with 0% being a transparent material that allows all light through and 100% being an opaque object that does not permit any light through; and
    wherein said at least one infrared pattern is visibly blended with the surface surrounding said at least one infrared pattern by having said coating being comprised of one or more of a paper, a plastic and a polyvinyl chloride wallpaper and said coating being made of a same color as the surface and having a same texture as the surface;
    wherein the printing step comprises printing the infrared pattern on, or adhering the infrared pattern to, a face of the material of the coating, and the overlaying step comprises adhering the face to a surface such that the coating is overlaid over the infrared pattern;
    wherein the coating comprises a roll of wallpaper, and the printing step comprises printing a plurality of infrared patterns, or adhering the plurality of patterns, onto the face of the wallpaper.

6. The method of claim 5, wherein the coating is comprised of a material that protects the infrared pattern from damage caused by abrasion, organic solvents, moisture, and sunlight.

7. The method of claim 5, wherein the thickness is between 50 and 300 microns.

8. The method of claim 5, wherein the printing step comprises printing the infrared pattern on, or adhering the infrared pattern to, a face of the material of the coating, and the overlaying step comprises adhering the face to a surface such that the coating is overlaid over the infrared pattern.

9. The method of claim 5, further comprising imaging an article including the infrared pattern and an overlaid coating with an imager capable of imaging infrared radiation, and enhancing the imaged infrared pattern with contrast enhancement and edge sharpening.

10. The method of claim 9, wherein the infrared pattern is a machine readable code, and the method further comprises reading the code.

11. The method of claim 9, wherein the surface is an interior wall or a ceiling of an environment, and the imaging step is performed when the environment is lit with only white fluorescent light.

12. The method of claim 9, further comprising, during the imaging step, sequentially projecting one or more of time-modulated near infrared radiation, short wave infrared radiation, or visible illumination onto the article, and, during the enhancing step, comparing at least one image of the article obtained with projected infrared radiation with a corresponding at least one image of the article obtained with ambient or projected visible illumination.

13. The method of claim 5, wherein said coating is made of an exact same material as said surface.

* * * * *